United States Patent
Cook

(10) Patent No.: US 11,579,807 B2
(45) Date of Patent: Feb. 14, 2023

(54) EFFICIENTLY ACCESSING, STORING AND TRANSMITTING DATA ELEMENTS

(71) Applicant: SYNCADD SYSTEMS, INC., Honolulu, HI (US)

(72) Inventor: Jason Darwin Cook, Port Orange, FL (US)

(73) Assignee: Syncadd Systems, Inc., Honolulu, HI (US)

( * ) Notice: Subject to any disclaimer, the term of this patent is extended or adjusted under 35 U.S.C. 154(b) by 58 days.

(21) Appl. No.: 17/225,938

(22) Filed: Apr. 8, 2021

(65) Prior Publication Data
US 2022/0326880 A1 Oct. 13, 2022

(51) Int. Cl.
*G06F 3/06* (2006.01)
*G06F 16/22* (2019.01)
*G06F 16/21* (2019.01)

(52) U.S. Cl.
CPC .......... *G06F 3/0659* (2013.01); *G06F 3/0604* (2013.01); *G06F 3/0673* (2013.01); *G06F 16/212* (2019.01); *G06F 16/221* (2019.01)

(58) Field of Classification Search
CPC .... G06F 3/0659; G06F 3/0604; G06F 3/0673; G06F 16/212; G06F 16/221
See application file for complete search history.

(56) References Cited

U.S. PATENT DOCUMENTS

| | | | |
|---|---|---|---|
| 7,216,127 B2 | 5/2007 | Auerbach | |
| 7,500,017 B2 | 3/2009 | Cseri et al. | |
| 7,680,800 B2 | 3/2010 | Claussen et al. | |
| 8,060,652 B2 | 11/2011 | Eller | |
| 8,874,620 B1 | 10/2014 | Rohr et al. | |
| 9,195,695 B2 | 11/2015 | Yates et al. | |
| 9,462,085 B2 | 10/2016 | Bullotta et al. | |
| 9,710,517 B2 | 7/2017 | Lightner et al. | |
| 9,762,637 B2 | 9/2017 | Bullotta et al. | |
| 10,191,693 B2 | 1/2019 | Sechdev | |
| 10,261,949 B2 * | 4/2019 | Greenwald | G06F 3/067 |
| 10,333,709 B2 | 6/2019 | Dictos | |
| 10,585,871 B2 | 3/2020 | Scherrer | |
| 2009/0132518 A1 * | 5/2009 | Vickery | G06F 16/2282 707/999.005 |
| 2016/0182416 A1 | 6/2016 | Rathod | |
| 2017/0124166 A1 | 5/2017 | Thomas et al. | |

FOREIGN PATENT DOCUMENTS

CN 111314480 6/2020

\* cited by examiner

*Primary Examiner* — Gary W. Cygiel
(74) *Attorney, Agent, or Firm* — Martin E. Hsia; Keri Ann K. S. Krzykowski

(57) ABSTRACT

Systems and processes for efficient accessing, storing and transmitting of fixed data elements and dynamic data elements, each having its own native form. The data elements are organized according to a schema, with (a) all fixed data elements stored in their native forms in a fixed memory allocation, and (b) each dynamic data element stored in memory in its own native form, in its own data allocation. With this memory structure, computational overhead of converting data elements from their native forms to JSON, XML or other markup language is avoided, making accessing data (getting), updating data (setting), converting data to a serial stream for transmission or other manipulation (serializing), deserializing, and other manipulations of the data elements much more CPU efficient and requiring less bandwidth.

16 Claims, 19 Drawing Sheets

DTD 470

| | |
|---|---|
| TYPE_BOOLEAN | 471 |
| TYPE_TINYINT | 472 |
| TYPE_SMALLINT | 473 |
| TYPE_INTEGER | 474 |
| TYPE_BIGINT | 475 |
| TYPE_FLOAT | 476 |
| TYPE_DOUBLE | 477 |
| TYPE_DATE | 478 |
| TYPE_TIMESTAMP | 479 |
| TYPE_VARCHAR | 480 |
| TYPE_NVARCHAR | 481 |
| TYPE_LONGNVARCHAR | 482 |
| TYPE_LONGVARCHAR | 483 |
| TYPE_NCHAR | 484 |
| TYPE_SQLXML | 485 |
| TYPE_NUMERIC | 486 |
| TYPE_BLOB | 487 |
| TYPE_BINARY | 488 |
| TYPE_VARBINARY | 489 |
| TYPE_UUID | 490 |
| TYPE_CHAR | 491 |
| TYPE_SUB | 495 |
| TYPE_FIXEDBINARY | 496 |

FIG. 4B

EFFICIENTLY ACCESSING, STORING AND TRANSMITTING DATA ELEMENTS

TECHNICAL FIELD

The present invention relates to efficiently accessing, storing and transmitting fixed data elements and dynamic data elements.

BACKGROUND ART

Most communications of data, such as between a server and a client, require much manipulation to become machine readable, that is, so that the Central Processing Unit (CPU) can directly use the data. For example, transfers of data for client/server communications are typically performed using modern data formats such as JavaScript Object Notation (JSON) and Extensible Markup Language (XML). These formats are human readable, but are bandwidth intensive, and the server/client must go through processing procedures or specialized hardware to interpret the data to make it machine readable.

At present, a typical CPU-intensive and bandwidth-intensive transmission from server to client proceeds as follows:

The client requests information from the server.

The server requests the information via connection driver from a connected database or databases. The database responds by packetizing the data records response and creates a schema to interpret the rows of data. The server then has overhead of reprocessing the data using a object relational mapper (ORM) or other internal format. The data is typically stored very fragmented in memory, typically centered around single rows of information or worse, single elements of information. From the mapper, the data is then processed and readied to send to the client using a format such as JSON/XML, taking more processing time from the CPU and consuming more memory. The column attribute (partial schema) is typically wrapped into every row and column of information. The server then sends the data consuming more bandwidth over the internet to the client.

The client receives the information from the server. The client then has to parse the data from JSON/XML, including the partial schema, one row at a time. The data is then reprocessed using an object relational mapper (ORM) or other internal format. The data is typically stored very fragmented in memory, mirroring the server fragments, typically centered around single row's of information or worse, single elements of information. Finally, the data is then available to be processed in some manner by the client.

In addition, due to the nature and complexity of data transfer, each communication requires custom complex software to interpret all of the data and typically exhibits software brittleness.

When the client transmits records to the server, the process described above is roughly followed in the reverse direction.

The following patents and publications are considered relevant to the present invention.

U.S. Pat. No. 10,585,871 to Scherrer, incorporated herein by reference, discloses a database engine for mobile devices and discloses sets of associated files segregated into fixed length and variable length data types for faster seek, read and write operations, and keeps track of changes to values and database table schema changes in terms of deletions and insertions of rows and columns.

U.S. Pat. No. 10,333,709 to Dictos, incorporated herein by reference, discloses a method and apparatus to support packing of both binary data and fields of non-binary logical data (e.g., JSON data) for transmission.

US patent publication US 20170124166 A1 to Thomas, et al., incorporated herein by reference, discloses a variable-length field schema to enable high performance stream processing on data.

U.S. Pat. No. 9,710,517 to Lightner, et al, incorporated herein by reference, discloses a data record compression with progressive and/or selective decomposition.

U.S. Pat. No. 10,191,693 to Sechdev, incorporated herein by reference, discloses performing updates on variable-length data sequentially stored and indexed to facilitate reverse reading.

U.S. Pat. No. 8,060,652 to Eller, incorporated herein by reference, discloses an extensible binary mark-up language for efficient XML-based data communications and related systems and methods.

U.S. Pat. No. 9,762,637 to Bullotta, et al., incorporated herein by reference, discloses a system and method of using binary dynamic REST (REpresentational State Transfer) messages, in which a processor uses description values of a metadata construct to determine one or more groups of data values of a message construct.

U.S. Pat. No. 9,462,085 to Bullotta, et al., incorporated herein by reference, discloses chunk-based communication of binary dynamic REST (REpresentational State Transfer) messages in which a processor initiates decoding of a received first data stream prior to complete receipt of a second received data stream.

U.S. Pat. No. 7,500,017 to Cseri, et al., incorporated herein by reference, discloses a method and system for providing an XML binary format by tokenizing tag and attribute names into numeric tokens to obviate the need for repetitive or redundant storage of lengthy Unicode words, etc.

US patent publication 20160182416 A1 to Rathod, incorporated herein by reference, discloses distributing messages in a network environment.

China patent CN111314480, incorporated herein by reference, discloses a load self-adaptive cross-platform file transfer protocol and distributed service implementation U.S. Pat. No. 7,680,800 to Claussen, et al., incorporated herein by reference, discloses an algorithm to marshal/unmarshal XML schema annotations to SDO data objects by including type information with transmission of a data object, then using unmarshaling code that uses the type information to obtain schema information for converting the transmission format element back to the data element.

U.S. Pat. No. 10,261,949 to Greenwalt, et al., incorporated herein by reference, discloses a packed row representation for efficient network serialization with direct column indexing in a network switch. The method includes storing the offset and a length of the variable length data in a fixed length storage element of the fixed length data storage portion.

U.S. Pat. No. 8,874,620 to Rohr, et al., incorporated herein by reference, discloses a data transfer optimization. A dataset structure that is suitable for transferring data between service components may include a table having one or more rows and a plurality of columns. A data transfer component may use the dataset structure to transfer data between the service components.

U.S. Pat. No. 7,216,127 to Auerbach, incorporated herein by reference, discloses a byte stream organization with improved random and keyed access to information structures. The invention improves processing time when accessing information in a byte stream and avoids the step of deserializing unneeded portions of the byte stream when the byte stream encodes an information structure corresponding to a schema with arbitrarily nested lists and tuples.

U.S. Pat. No. 9,195,695 to Yates, et al., incorporated herein by reference, discloses a technique for compressing columns of data.

DISCLOSURE OF INVENTION

Definitions of technical terms used in this section are provided below, in the section entitled "TECHNICAL DEFINITIONS."

In a preferred embodiment, the invention is a process for efficiently accessing, storing and transmitting data elements in a computer memory, in which the data elements are defined by a schema into a set of rows with the data elements in each row related to each other, and with each of the rows containing columns, all the data elements related to a column by the schema having the same column attributes, the column attributes defining whether the data elements in a column are fixed data elements or dynamic data elements, and byte length of each of the fixed data elements, and the data elements in a column of a row corresponding to the data elements in the same column in different rows. The steps of this process are determining from the column attributes whether the data elements in a column are fixed data elements or dynamic data elements, then storing the fixed data elements in fixed element rows and fixed element columns in at least one fixed length allocation in the memory. Fixed data elements in the fixed element rows remain related to each other, the fixed data elements in the fixed element columns have the same column attributes, and the fixed data elements in a fixed element column of a fixed element row correspond to the fixed data elements in the same fixed element column in different fixed element rows. The process continues with storing the dynamic data elements in dynamic element rows and dynamic element columns in dynamic data allocations in the memory, with the dynamic data elements in the dynamic element rows remaining related to each other, the dynamic data elements in the dynamic element columns having the same column attributes, and the dynamic data elements in a dynamic element column of a dynamic element row corresponding to the dynamic data elements in the same dynamic element column in different dynamic element rows.

In another embodiment, the invention is a process for getting data elements stored in a computer memory, in which the data elements are defined by a schema into a set of rows, with data elements in each row related to each other, and with each of the rows containing columns, ail the data elements related to a column by the schema having the same column attributes. The column attributes define whether data elements in a column are fixed data elements or dynamic data elements, and byte length of each of the fixed data elements. The fixed data elements are stored in fixed element rows and fixed element columns in at least one fixed length allocation in the memory, the fixed data elements in the fixed element rows being related to each other, the fixed data elements in the fixed element columns having the same column attributes, and the fixed data elements in a fixed element column of a fixed element row corresponding to the fixed data elements in the same fixed element column in different fixed element rows. Dynamic data elements are stored in dynamic element rows and dynamic element columns in dynamic data allocations in the memory, the dynamic data elements in the dynamic element rows remain related to each other, the dynamic data elements in the dynamic element columns have the same column attributes, and the dynamic data elements in a dynamic element column of a dynamic element row correspond to the dynamic data elements in the same dynamic element column in different dynamic element rows. The process comprises getting a requested data element having a requested column and a requested row, by determining from the column attribute of the requested column whether the requested data element is a fixed data element or a dynamic data element. If the requested data element is a fixed data element, translate the requested column and the requested row to a fixed element row and a fixed element column and access the fixed element row and the fixed element column in the fixed length allocation to get, without conversion, the requested data element. If the requested data element is a dynamic data element, translate the requested column and the requested row to a dynamic element row and a dynamic element column and access the dynamic element row and the dynamic element column in the dynamic length allocation to get the requested data element.

In another embodiment, the invention is a process for setting data elements in a computer memory, the data elements defined by a schema into a set of rows, with data elements in each row related to each other, and with each of the rows containing columns. All the data elements related to a column by the schema have the same column attributes, and the column attributes define whether data elements in a column are fixed data elements or dynamic data elements, and byte length of each of the fixed data elements. The fixed data elements are stored in fixed element, rows and fixed element columns in at least one fixed length allocation in the memory. The fixed data elements in the fixed element rows are related to each other, the fixed data elements in the fixed element columns have the same column attributes, and the fixed data elements in a fixed element column of a fixed element row correspond to the fixed data elements in the same fixed element column in different fixed element rows. Dynamic data elements are stored in dynamic element rows and dynamic element columns in dynamic data allocations in the memory, the dynamic data elements in the dynamic element rows remain related to each other, the dynamic data elements in the dynamic element columns have the same column attributes, and the dynamic data elements in a dynamic element column of a dynamic element row correspond to the dynamic data elements in the same dynamic element column in different dynamic element rows. The process is setting a value of a requested data element having a requested column and a requested row, by determining from the column attribute of the requested column whether the requested data element is a fixed data element or a dynamic data element. If the requested data element is a fixed data element, translate the requested column and the requested row to a fixed element row and a fixed element column and access the fixed element row and the fixed element column in the fixed length allocation, then set the value, without conversion, at the fixed element row and the fixed element column. If the requested data element is a dynamic date element, store the requested data element in a new dynamic memory allocation in the memory. Then translate the requested column and the requested row to a dynamic element row and a dynamic element column and access the dynamic element row and the dynamic element column. Then replace the dynamic data element for the dynamic element row and the dynamic element column with the new dynamic data element.

In another embodiment, the invention is a process for serialization of data elements stored in a computer memory, in which the data elements include data elements defined by a schema into a set of rows, with data elements in each row related to each other, and with each of the rows containing columns, all the data elements related to a column by the schema having the same column attributes. The column attributes define whether data elements in a column are fixed data elements or dynamic data elements, and byte length of each of the fixed data elements. The fixed data elements are stored in fixed element rows and fixed element columns in at least one fixed length allocation in the memory. The fixed data elements in the fixed element rows are related to each other, the fixed data elements in the fixed element columns have the same column attributes, and the fixed data elements in a fixed element column of a fixed element row correspond to the fixed data elements in the same fixed element column in different fixed element rows. The dynamic data elements are stored in dynamic element rows and dynamic element columns in dynamic data allocations in the memory. The dynamic data elements in the dynamic element rows remain related to each other, the dynamic data elements in the dynamic element columns have the same column attributes, and the dynamic data elements in a dynamic element column of a dynamic element row correspond to the dynamic data elements in the same dynamic element column in different dynamic element rows. The process is generating a schema length identifier, identifying byte length of the schema, and sending to a serial stream the schema, so that ending of the schema can be determined by the schema length identifier. Then the process continues by providing a total number of rows indicator to the serial stream indicating a total number of the rows and sending to the serial stream the fixed data elements directly from the fixed-length allocations, so that no conversion of the fixed data elements is necessary. The process continues by generating byte length identifiers stating byte length of each dynamic data element for each column having dynamic data elements, then sending to the serial stream the dynamic data elements, each dynamic data element with a byte length identifier for that dynamic data element, so that ending of each the dynamic data element is determined from the byte length stated in the byte length identifier. The schema length identifier, schema, total number of rows indicator, fixed data elements, and dynamic data elements can occur in any order, provided that the same ordering is used in serialization and deserialization, or an order length identifier is utilized to specify order.

Another embodiment is a process as described in the preceding paragraph, with the additional steps of receiving from the serial stream the schema, then reconstituting the schema, so that ending of the schema can be determined by the schema length identifier. The process continues with receiving from the serial stream the total number of rows identifier. The process then continues with receiving and storing the fixed data elements in receiving fixed element rows and receiving fixed element columns in receiving fixed data allocations in a receiving memory, so that no conversion is necessary. In this manner, the fixed data elements are reconstituted in the receiving fixed element rows and the receiving fixed element columns. The process then continues with receiving the stream for the dynamic data elements, so that ending of each dynamic data element is determined from the byte length identifier, and storing the dynamic data elements in receiving dynamic element rows and receiving dynamic element columns in dynamic data allocations in the receiving memory. The dynamic data elements are reconstituted in the receiving dynamic element rows and the receiving dynamic element columns in the receiving memory. The schema length identifier, schema, total number of rows indicator, fixed data elements, and dynamic data elements can occur in any order, provided that the same ordering is used in serialization and deserialization, or an order length identifier is utilized to specify order.

Further embodiments of the invention are processes according to any of the preceding paragraphs relating to processes, in which the fixed data elements are selected from the group consisting of native data and binary data. In the presently preferred embodiment of the invention, native data is preferred.

Further embodiments of the invention are processes according to any of the preceding paragraphs relating to processes, in which the dynamic data elements are selected from the group consisting of native data, binary data, and deserialized data. In the presently preferred embodiment of the invention, native data and binary data are preferred.

Further embodiments of the invention are processes according to any of the preceding paragraphs relating to processes, further comprising, creating a set of pointers in the memory which point to the dynamic data allocations which contain the dynamic data elements, so that the dynamic data elements are defined by the pointers into dynamic element rows and dynamic element columns.

Another embodiment of the invention is a process for efficiently accessing, storing and transmitting fixed data elements in a computer memory, in which the fixed data elements are defined by a schema into a set of rows with the fixed data elements in each row related to each other, and with each of the rows containing columns, all the fixed data elements related to a column by the schema having the same column attributes. The column attributes define byte length of each of the fixed data elements, and the fixed data elements in a column of a row correspond to the fixed data elements in the same column in different rows. The process includes storing the fixed data elements in fixed element rows and fixed element columns in at least one fixed length allocation in the memory, with fixed data elements in the fixed element rows remaining related to each other, the fixed data elements in the fixed element columns having the same column attributes, and the fixed data elements in a fixed element column of a fixed element row corresponding to the fixed data elements in the same fixed element column in different fixed element rows.

Another embodiment of the invention is a process as described above in which the fixed data elements are selected from the group consisting of native data and binary data. In the presently preferred embodiment of the invention, native data is preferred.

Another embodiment of the invention is a process as described above, in which at least one of the column attributes is whether a data element is nullable, so that at least one of the fixed data elements could be null, further comprising generating a null zone identifying fixed data elements that have a column attribute of being nullable, identifying when a column containing fixed data elements has a row containing a null value.

Another embodiment of the invention is a process as described above, in which the null zone is stored in the at least one fixed data allocation.

An alternative embodiment of the invention is a process as described above, in which the null zone is stored in a null zone allocation in said memory.

In another embodiment, the invention further includes wherein storing the dynamic data elements is performed without conversion.

In another embodiment, the invention further includes wherein getting the requested dynamic data element is performed without conversion.

In another embodiment, the invention further includes wherein translating the requested dynamic data element is performed without conversion.

In another embodiment, the invention further includes wherein sending dynamic data elements to the serial stream is performed without conversion.

The improvement due to using the invention can be seen from the following, which contrasts with the conventional process described starting on the first page.

The client requests information from the server.

The server requests information via connection driver from the connected database or databases. If the schema is unknown to the server, the connected database creates a schema for the result information. The connected database passes the information directly into a machine readable form on the server. The data is then processed. If the schema is unknown to the client, a single schema is sent to the client for how to interpret all rows of data. Rows of fixed data are packaged in memory as a single memory allocation. Dynamic data such as strings, images, videos, data blobs, etc. are sent with a variable length quantity followed by the raw machine data for each element. The server then sends over the internet the data consuming less bandwidth to the client.

The client receives the information from the server. If the schema is unknown by the client, a single schema is received for all rows and is interpreted defining the column attributes. All row information for fixed information is bulk read with no need for interpretation as it is already machine readable. The row information for the dynamic information is then bulk read for each element with little or no need for interpretation as it is already machine readable. The client then processes the information.

When the client transmits records to the server, the process described above is roughly followed in the reverse direction.

BRIEF DESCRIPTION OF DRAWINGS

FIG. 4B is a block diagram containing a list and details of some of the possible data types utilized by the invention.

FIG. 13B is a continuation of the serialization flow chart detailing fixed data in FIG. 13A.

FIG. 14B is a continuation of the deserialization flow chart detailing fixed data in FIG. 14A.

BEST MODES FOR CARRYING OUT THE INVENTION

Figure 1A:
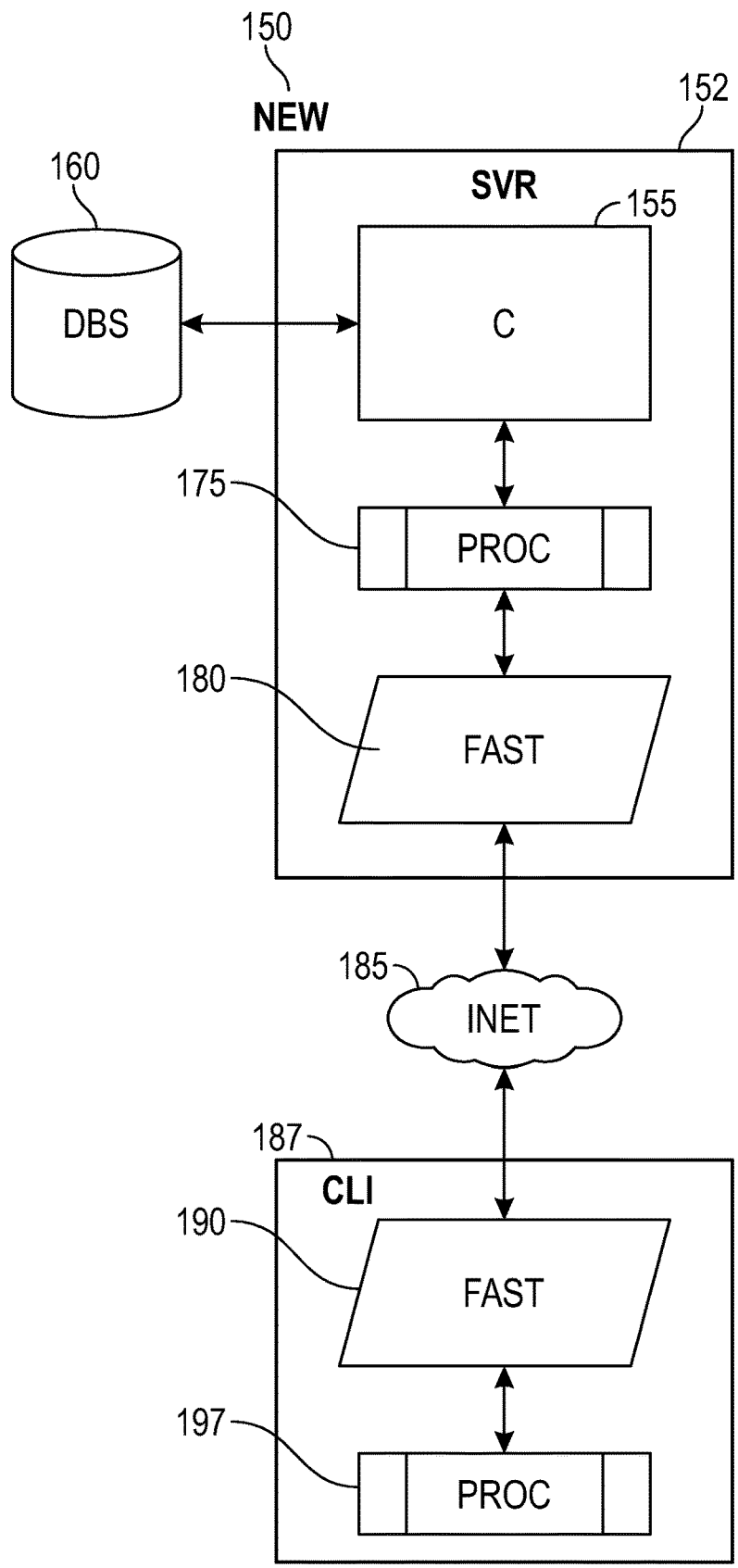
FIG. 1A and FIG. 1B are block diagrams demonstrating how the invention compares to traditional server/client architecture.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure. Relevant technical definitions are provided first.

Technical Definitions bit—the smallest possible piece of data, with one of only two possible values, commonly represented as 1 or 0, but other representations, such as true/false, yes/no, or on/off, are common.

binary—representing numbers in base 2, in which there are only two numbers: 0 and 1. At the most fundamental level, all information on computers is ultimately stored in binary bits. Binary includes all the standard definitions of binary data such as data in various formats (.midi, .jpeg, .png, .mp4), but also includes data elements such as items that require some form of processing to be directly usable by a computer, such as text (json, xml, etc.).

byte—a group, of eight bits. Memory, storage, and processing of date typically occur on bytes of data instead of on individual bits, because a byte is normally the smallest unit of addressable memory data with a unique memory address).

record or row—a group of pieces of data that typically has some type of relationship. Not necessarily a physical row or other physical representation. While the present invention can be utilized without the use of databases and is typically not associated with spreadsheets a tow can be thought of in the same manner as a rod, in a database, or a single row in a spreadsheet. An example of row information is a row for each customer, with columns defined for customer number, name, timestamp_created, timestamp_last_access, etc.

data element—a single piece of data that is part of a record or row. A specific customer's name is a data element. A specific customer's sin code is also a data element.

column—a group of data elements from a group of records, with a single corresponding data element from each record or row, and all the data elements having the same common column attributes (defined below). Not necessarily a physical column or other physical representation. An example of a column is a group containing all customers' zip codes.

column attributes—the attributes of the data elements in a column. The column attributes cannot changed for the rows defined by a schema. The column attributes include column name details, table name (if appropriate), database schema name (if appropriate), nullability, data type information such as integer, long, float, string, etc. Column attributes are also used to determine, if the column is defined as fixed placing the data in fixed data elements or dynamic placing the data in dynamic data elements.

schema—a definition of the data elements in rows and columns, thereby describing column headings and column attributes, giving column name, data type, and other details of each column. While a row could contain one or more data elements that are hierarchical in nature (allowing nesting), the number of columns for a particular schema is fixed, similar to database table design. Like a database, the schema can be updated to include more columns or change column attributes. When undated, the data is manipulated appropriately to handle the new schema definition.

In the presently preferred embodiment of the invention, the schema, unlike a nested node/leaf design where each row could be defined with a different schema, all the rows and columns are governed by a single schema of a fixed number of columns. While one of the columns of the schema could define a sub-hierarchy defined in FIG. 4 TYPE_SUB 495, the sub-hierarchy of a specific row in a specific column may be governed by its own unique single schema of a fixed number of columns. This structured approach increases efficiency of all operations both for fixed data elements and dynamic data elements as simple functions or methods can be utilized for accessing, storage, changing, transmitting, serialization, deserialization, and other processes and manipulations.

deserialized data—converting a serialized form of data and rebuilding the data back into its original form. In the presently preferred embodiment of the invention, deserialized data may include one or more of data allocations, data objects, data structures, typedefs, containers, offset sets, or sets.

fixed data elements—data elements that are fixed in byte length, where the byte length is determined by the column attributes. Examples of fixed data elements include byte, short, integer, long, float, double, timestamp, and UUID.

dynamic data element—Typically variable in byte length, utilizes multiple allocation systems, typically change often and exact details of the dynamic data element are determined by the column attributes. Examples of dynamic data elements include variable length text, images, scalable vector graphics, geographic objects, audio, video, compressed elements, and encrypted elements. It is preferred that dynamic data elements in a computer's memory be addressed by using pointers that point at the address of an actual dynamic data element. In the presently preferred embodiment of the invention, for the majority of cases, the pointer to the dynamic data element points to a low-level memory allocation. There are exceptions to this general rule such as TYPE_SUB 495 (see FIG. 4B). In cases such as TYPE_SUB 495, instead of pointing to a memory allocation, the pointer would point to deserialized data. In the presently preferred embodiment of the invention, the deserialized form may contain one or more objects, structures, typedefs, containers, offset sets, or sets, so that the user of the invention has direct access to the contents in a deserialized data form. Thus, the term "allocation" shall be interpreted to include memory allocation, object construction, structure initialization, etc. In preferred embodiments of the invention, more exceptions could be plugged in, allowing direct utilization of the specific data type. Examples of additional exceptions are compression/decompression and encryption/decryption.

native—data in a format that is directly readable by a computer running a particular computer program, for the purpose of that computer program, with no or minimal processing. To maintain platform independence, in some cases, native may require minimal translation by the CPU such as swapping the endianness of the data.

no conversion or without conversion—avoiding coercion of data elements so that the data elements can remain formatted in their native form, or in binary form, during accessing, storage, changing, transmitting, serialization, deserialization, and other processes and manipulations. The invention allows direct access to both fixed data elements and dynamic data elements as chunks of raw data in their native form or binary form, for accessing, storage, changing, transmitting, serialization, deserialization, and other processes and manipulations. Without the need for conversion, necessary computing resources are reduced dramatically for accessing, storing, changing, transmitting, serializing, deserializing and otherwise processing or manipulating the data elements.

With no conversion, both fixed data elements and dynamic data elements may optionally utilize an easy to use function or method suite for accessing, storage, changing, transmitting, serialization, deserialization, and other processes and manipulations. The function or method suite does not change, convert, or manipulate the data away from its native or binary form, nor does the function or method suite create a set of objects based off of the data (reducing processing overhead dramatically). The function or method suite does not require knowledge that the elements are fixed data elements or dynamic data elements; requesting a column and row to obtain the element data is sufficient.

Performance gains due to no conversion are further realized for both serialization and deserialization as the chunks of native or binary data can be directly written, without conversion, to the serialization stream and directly read, without conversion, from the deserialization stream.

Fixed data elements are always utilized without conversion. In utilization of dynamic data elements, it is preferred that no conversion is necessary. In utilization of dynamic data elements, in presently preferred embodiments, there are exceptions to this general rule based off of the type of data such as TYPE_SUB 495 (see FIG. 4B). In cases such as TYPE_SUB 495, instead of pointing to a memory allocation where no conversion is necessary, the pointer would point to deserialized data. In the presently preferred embodiment of the invention, the deserialized data may contain one or more objects, structures, typedefs, containers, offset sets, or sets so that the use of the invention has direct access to the contents in a deserialized data form. For dynamic data elements, in preferred embodiments of the invention, more exceptions (to the general rule of no conversion is necessary) could be plugged in, allowing direct utilization of the specific data type. Examples of additional exceptions are compression/decompression and encryption/decryption. It is preferred, that when there are exceptions, that the amount of conversion necessary is minimized as much as possible.

In a typical configuration such as in markup languages like JSON and XML, there is processing overhead to convert the data from the markup language into native form so that the CPU can interpret the data. In addition, there is overhead to convert the data from native CPU format to the markup language's format. The resource overhead occurs for any and all communication between systems utilizing the markup language technology.

For background information, conversion relates to sets of data elements and the structure of those data elements and the steps and necessary to convert the data elements and the structure of those data elements from one format to another. coerce or coercion—translation of a value into another value with a different data type. Examples of translation are: integer to a string, a string to a floating point, floating point to an integer, or a floating point to a double. More examples are: taking a value from a markup language data element in JSON, XML, or other markup language, and translating it to a format that the CPU understands, such as native or binary, or taking a value the CPU understands, such as native or binary, and translating it to a data element in JSON, XML, or other markup language.

machine readable—when used in the context of a particular computer program, same meaning as native.

basic data type—basic data types include integers, floating point, and text characters. The values of basic data types of a data element are usually expressed in units of one to sixteen bytes. The size of the unit of a basic data type can increase the range of values, precision, or number of bytes for characters (such as in UTF-8, ASCII, and multi-byte Unicode).

floating point—a method of storing numbers in "scientific notation" and is typically complaint with Institute of Electrical and Electronics Engineers 754 floating point standard.

integer—a number with no fractional (or decimal) part. A counting number, like 1, 2, 3, and so on, but including 0 and the negatives.

string—a sequence of text, numeric, or other characters, such as "He said !@#*&%@#*?!". A string does not have to be entirely printable.

null—a special marker indicating that something has no value. A record that contains a data element for a person's middle name would be null if no middle name is provided.

null pointer—null pointers are used in computer programming to indicate that a value is uninitialized, undefined, empty, or meaningless.

big-endian—data that is stored with the most significant byte at a lower byte address than the least significant byte. See little-endian. Some CPUs (central processing unit—the brain of a computer) natively understand big-endian format. While not guaranteed, data streams are typically filled using big-endian format. If not natively understood, it is a quick CPU operation to swap the byte order for native interpretation. Even when swapping the byte order of a big-endian data stream in order to use a little-endian CPU, processing is vastly superior to conventional translation of text (described below), and CPU performance is still near the speed of processing when using data in native format.

little-endian—data that is stored with least significant byte of a basic data type at a lower byte address than the most significant byte. See big-endian.

markup language—system for annotating a document or elements in a way that is syntactically distinguishable from the elements. When processed, the markup language is not shown but is utilized to provide details about the elements such as if the element is a number, boldfaced, a hyperlink, etc.

eXtensible Markup Language or XML—a markup language that defines a set of rules for encoding documents in a format that is both human-readable and machine-readable. The World Wide Web Consortium's XML 1.0 Specification of 1998 and several other related specifications—all of them free open standards—define XML. The design goals of XML emphasize simplicity, generality, and usability across the Internet. It is a textual data format with strong support via Unicode for different human languages. Although the design of XML focuses on documents, the language is widely used for the representation of arbitrary data structures such as those used in web services. Several schema systems exist to aid in the definition of XML-based languages, while programmers have developed many application programming interfaces (APIs) to aid the processing of XML data.

JSON or JavaScript Object Notation—an open standard file format, and data interchange format, that user human-readable text to store and transmit data objects consisting of pairs of an attribute and a value, and array data types (or ay other serializable value). It is a very common data format, with a diverse range of applications, such as serving as a replacement for XML in AJAX (Asynchronous JavaScript and XML) systems. JSON is a language-independent data format. It was derived from JavaScript, but many modern programming languages include code to generate and parse JSON-format data. The official Internet media type for JSON is application/json. JSON filenames use the extension .json.

object-relational mapping or ORM, O/RM or O/R mapping tool—a programming technique for converting data between incompatible type systems using object-oriented programming languages. This creates, in effect, a "virtual object database" that can be used from within the programming language. There are both free and commercial packages available that perform object-relational mapping, although some programmers opt to construct their own ORM tools.

serialization—a process of translating data into a format that can be stored or transmitted, typically in a single stream of data (a serial stream), and reconstituted later in a receiving memory. When the resulting series of bits is reread according to the serialization format, it can be used to create an identical clone of the original data in the receiving memory, through the reverse process, called deserialization.

deserialized data—data that has been converted from a serialized form of data and rebuilt back into data usable by the computer. In the presently preferred embodiment of the invention, the deserialized data could be in the form of data allocations, data objects, data structures, typedefs, data containers, or sets that were previously serialized.

UTF-8—a variable-width character encoding used for electronic communication. Defined by the Unicode Standard, the name is derived from Unicode (or Universal Coded Character Set) Transformation Format-8-bit. UTF-8 is capable of encoding all 1,112,064 valid character code points in Unicode using one to four one-byte (8-bit) code units. Code points with lower numerical values, which tend to occur more frequently, are encoded using fewer bytes. It was designed for backward compatibility with ASCII: the first 128 characters of Unicode, which correspond one-to-one with ASCII, are encoded using a single by with the same binary value as ASCII, so that valid ASCII test is valid UTF-8-encoded Unicode as well. Because ASCII bytes do not occur when encoding non-ASCII code points into UTF-8, UTF-8 is safe to use within most Programming and document languages that interpret certain ASCII characters in a special way, such as "/" (slash) in filenames, "\" (backslash) in escape sequences, and "%" in printf.

cyclic redundancy check or CRC—an error-detecting code commonly used in digital networks and storage devices to detect accidental changes to raw data. Blocks of data entering these systems get a short check value attached, based on the remainder of a polynomial division of their contents. On retrieval, the calculation is repeated and, in the event the check values do not match, corrective action can be taken against data corruption. CRCs can be used for error correction. CRCs get their name because the check (data verification) value is a redundancy (it expands the message without adding information) and the algorithm is based on cyclic codes. Because the check value has a fixed length, the function that generates it is occasionally used as a hash function.

SHA-1—In cryptography, SHA-1 (Secure Hash Algorithm 1) is a cryptographic hash function which takes an input and produces a 160-bit (20-byte) hash value known as a message digest. For data integrity, revision control systems such as Git, Mercurial, and Monotone use SHA-1, not for security, but to identify revisions and to ensure that the data has not changed due to accidental corruption.

software brittleness—increased difficulty in fixing software that may appear reliable, but fails badly when presented with unusual data or altered in a seemingly minor way. The phrase is derived from analogies to brittleness in metalworking.

thread locking—a synchronization technique. A lock is an abstraction that allows at most one thread to own it at a time. Holding a lock is how one thread tells other threads: "I'm changing this thing, don't touch it right now." Without thread locking, when multiple threads attempt to change at the same time, the, results could include: code crashes, memory corruption, incorrect values being set, etc.

least significant bit (lsbit)—the bit position in a binary integer giving the units value, that is, determining whether the number is even or odd. The lsbit is sometimes referred to as the low-order bit or right-most bit, due to the convention in positional notation of writing less significant digits further to the right. It is analogous to the least significant digit of a decimal integer, which is the digit in the ones (right-most) position.

least significant byte (LSB)—the meaning is parallel to the above: it is the byte (or octet) in that position of a multi-byte number which has the least potential value. If the abbreviation's meaning least significant byte isn't obvious from context, it should be stated explicitly to avoid confusion with least significant bit.

most significant bit (msbit)—the most significant bit (msbit, also called the high-order bit) is the bit position in a binary number having the greatest value. The msbit is sometimes referred to as the high-order bit or left-most bit due to the convention in positional notation of writing more significant digits further to the left.

most significant byte (MSB)—the meaning is parallel to the above: it is the byte (or octet) in that position of a multi-byte number which has the greatest potential value.

Bitwise operations—bitwise operations are contrasted by byte-level operations which characterize the bitwise operators' logical counterparts, the AND, OR and NOT operators. Instead of performing on individual bits, byte-level operators perform on strings of eight bits (known as bytes) at a time. The reason for this is that a byte is normally the smallest unit of addressable memory (i.e. data with a unique memory address).

Bitwise AND

| bit a | bit b | a AND b |
|-------|-------|---------|
| 0 | 0 | 0 |
| 0 | 1 | 0 |
| 1 | 0 | 0 |
| 1 | 1 | 1 |

AND does its work on the bits of the operands rather than the truth value of the operands. Bitwise binary AND does the logical AND (as shown in the table above) of the bits in each position of a number in its binary form.

For instance, working with a byte (the char type):

$$\begin{array}{rl} & 11001000 \\ \text{AND} & 10111000 \\ \hline = & 10001000 \end{array}$$

The most significant bit of the first number is 1 and that of the second number is also 1 so the most significant bit of the result is 1; in the second most significant bit, the bit of second number is zero, so we have the result as 0.

Bitwise OR

| bit a | bit b | a OR b |
|-------|-------|--------|
| 0 | 0 | 0 |
| 0 | 1 | 1 |
| 1 | 0 | 1 |
| 1 | 1 | 1 |

Similar to bitwise AND, bitwise OR only operates at the bit level. Its result is a 1 if one of the either bits is 1 and zero only when both bits are 0.

$$\begin{array}{rl} & 11001000 \\ \text{OR} & 10111000 \\ \hline = & 11111000 \end{array}$$

lookup—a form of indexing. Lookup is typically a numeric value that then corresponds with some text that the numeric value is related to. Typical numeric values are: incrementing, CRC, MD5, SHA-1, Java's hashcode, other hash algorithms. Practical embodiments of the invention would limit standard lookups to 4 bytes as the size is small, but large enough to avoid most collision cases. For proper serialization and deserialization, when a lookup is used, it is important that serialization and deserialization are consistent with what lookup method is used for each section. In some embodiments of the invention, the lookup method could be also be encoded with a lookup type, allowing a suite of methods numeric lookup types to be available. In the presently preferred embodiment of the invention, lookup utilizes a CRC. CRC refers to Cyclic Redundancy Check and is typically used both for data integrity and as a hash function. CRC values used by the invention are preferably 4 bytes. In some embodiments of the invention, a lookup may not be utilized, but rather the original value such as text is used instead.

identifier—an identifier for a data element is optimally a variable length quantity (VLQ) stating the length of that data element. The term "identifier" is used herein for all things related to some form of length marker or termination marker. In some practical embodiments of the invention, an identifier could be a quantity with a rigidly defined length, for example, two bytes, one byte, or a fixed number of bytes. In other practical embodiments of the invention, the identifier could still have a variable length, but use a different methodology than the one defined as a VLQ. In some practical embodiments of the invention, the identifier may be some other quantity or text representation, other than the number of rows or number of bytes. For example a multi-byte Unicode string could contain the number of characters of text rather than the number of bytes. In some practical embodiments of the invention, rather than having a numeric quantity, the identifier could simply be a termination marker. In the case of a termination marker, rather than preceding the data it pertains to, the termination identifier would occur directly after the data. Under some practical embodiments of the invention, the identifiers for a group of data elements would be provided as a grouping all together, and then the data would follow the entire group.

variable length quantity or VLQ—a universal code that uses an arbitrary number of binary octets (eight-bit bytes) to represent an arbitrarily large integer. A VLQ essentially uses the first seven bits of a byte as a base-128 (2 to the $7^{th}$ power) representation of an unsigned integer, with the eighth bit indicating whether there is a continuation of bytes. Because the continuation is marked with the eighth bit, VLQ is written in little endian form. VLQ is used instead of using an arbitrarily large number of fixed bytes to hold for a potential huge number. Only the amount of bytes necessary are used to house the number. The format is efficient for the CPU to encode and decode.

A byte consists of 8 bits. The lowest bit, or least significant bit (lsbit), is referred to as bit 0. The value of bit zero, if high is 2 raised to the zeroth (the bit number) power=1. The second lowest bit is referred to as bit 1. The value of bit 1 if high is 2 raised to the first (the bit number) power=2. The highest bit, or most significant bit (msbit), in a byte is bit 7. The value of bit 7 if high is 2 raised to the seventh (the bit number) power=128.

When writing to a byte stream, the following loop is performed:
1. The inputNumber is divided by 128.
2. If the inputNumber after the division is >=1, then the remainder+128 (msbit high) as an integer is written as a single byte to the output stream. The inputNumber is then modified so that the remainder (fractional exponent) is removed. The resulting inputNumber is then plugged back into step 1.
3. If the inputNumber after the division is <1, then the remainder, as a single byte integer is written to the stream and job is complete.

When reading from a byte stream, the following loop is performed:
1. outputValue=0, nMult=1;
2. A byte number is read from the input stream.
3. If the byte number is >127, outputValue=outputValue)+ (byte number−128) times nMult). nMult=nMult times 128. Continue with step 2.
4. If the byte number is <=127, outputValue=(outputValue times 128)+byte number. The outputValue is now returned for consumption.

All integers in the above are unsigned in nature (without negative values).

The description for reading and writing VLQ to a stream above is presented for clarity. Software optimizations are performed in the programming language at hand to insure read and write achieve high performance. These optimizations could include any or all of the following: bitwise AND operations, bitwise OR operations, bit shifting, other bit operations, modulus operations, integer math optimizations, low level machine instruction, registers, etc. Encoding examples following the write to byte stream flow:

102 translates to a single byte number: 102.
  Step 1: InputNumber=102. 102/128=0.796875
  Step 2: 0.796875 is NOT greater than one, so the rest of Step 2 is skipped.
  Step 3: 0.796875 less than one, and the remainder is 102, so that is the final byte.
355 translates to two bytes: 227 2
Step 1: InputNumber=355. 355/128=2.7734375
Step 2: 2.7734375 is greater, than one, with a remainder of 99+128=227 which is the first byte. InputNumber is now set to 355/128 rounded down to the nearest integer=2 and is fed back to Step 1 (shown below)
step 1: InputNumber=2. 2/128=0.015625
Step 2: 0.015625 is NOT greater than one, so the rest step 2 is skipped.
Step 3: 0.015625 is than less than one, and the remainder is 2, so this is the final byte.
700 translates to two bytes: 188 5
4,125 translates to two bytes: 157 32
754,812 translates to three bytes: 252 136 46
7,128,288,365,123 translates to seven bytes 195 148 226 248 186 207 1 Notice in each case, the final byte is less than 128, signifying that it is the last byte in the sequence.

fragmentation—a phenomenon in which memory for storage in a computer is used inefficiently, because pieces data are stored in different non-contiguous parts of the memory, reducing capacity or performance and often both. The exact consequences of fragmentation depend on the specific system of storage allocation in use and the particular form of fragmentation.

The invention focuses on drastically reducing the amount of bandwidth, CPU utilization, number of steps, and the amount of software development required to both communicate, persist, consume and manipulate data. At the same time, the invention does not increase the complexity of the code to consume, access, or alter the data. In many cases, the complexity of the code to interact with the data is greatly reduced.

Indeed, it is expected that, with this invention, the increased efficiency in serialization and preservation of native formats (instead or converting to JSON or XML, etc.) computer processing efficiency may be increased by 10 times or better. Bandwidth consumption is also reduced and it is not uncommon to see bandwidth consumption reduced by a factor of 5 times or better.

In some implementations, no connection to database is necessary. The invention is simply used to define packet data, events, and/or ways to persist information.

In some implementations, both connection to database for data definitions as well as custom data definitions are necessary for both communication to the database and to handle events and/or ways to persist information.

In some implementations, communication and consumption could occur between server systems, databases, peer systems, desktop systems, laptops, multimedia devices, pda devices, smart phones and/or micro-controller devices.

In some implementations, the utilization of the technology is completely internal with no external communication using the technology.

For communicating to legacy or external systems, the ability to translate to standard output technologies such as JSON and XML is available but internal performance benefits for consumption are still realized on the server device by reducing memory footprint and increased performance in processing information.

In another implementation, object relational mapping (ORM) could still be utilized, and still performance benefits are applicable, as both formats are machine readable and there is no need for text translation.

It is typical to see vast improvement in performance and scalability regardless of protocol of implementation. While not limited to any type of communication, typical network communications are established through TCP/IP, UDP, Datagram delivery, Bluetooth, Bluetooth LE, etc.

In addition, it is easy to persist and reconstitute to and from any type of storage medium.

Because the data is stored less fragmented in memory and is machine readable, it is possible to efficiently utilize the invention to implement a robust cache server, magnifying performance improvements.

The invention can operate inside additional layers such as encryption, compression, and encoding. In addition, since the size of each communication is smaller, efficiency is gained on the additional layers.

The invention employs several techniques to reduce the overhead and complexity of common access and serialization practices:

When the data is used and processed, in memory, it is nearly identical to the format the data is formatted when transmitted on a stream or used in persistence. If a row or column of information is not consumed by the code that received the data, there is little to no additional CPU overhead associated with that row or column.

When detailing flow charts and block diagrams, when text is contained quotes, the text in quotes is a variable that can contain a value identifier, such as "row" or "fixed final offset", and "fixed row size."

In presently preferred embodiments of the invention, fixed data elements for all rows are held in one fixed data allocation in the computer's memory. When it is time to serialize, the fixed data elements can be transmitted by a single push of that fixed data allocation.

In presently preferred embodiments of the invention, fixed element columns are a computation of byte offset into the specified fixed element row. Fixed element rows are a computation of the total bytes necessary (fixed row size) to store a fixed data element row multiplied by the row number. Details of this process are outlined in depth FIG. 5. Other methods, computations, or procedures could be utilized to determine the fixed element columns and fixed element rows.

For dynamic data elements, such as strings, audio, images, etc., the entire allocation for each dynamic data element is transmitted to the stream without the need for translation.

In the presently preferred embodiment of the invention, conventional database design, none of lengths, offsets, or pointers of the dynamic data elements is included in the fixed length data elements, and there is no information or reference to the dynamic data elements in the fixed length data elements.

In presently preferred embodiments of the invention, dynamic, element columns are a computation of the column specified dynamic element row. Dynamic element rows are a computation of the total dynamic element columns (dynamic row size) to store a dynamic data element row multiplied by the row number. Details of this process are outlined in depth in FIG. 6A and FIG. 6B. Other methods, computations, or procedures could be utilized to determine the dynamic element columns and dynamic element rows.

In the presently preferred embodiment of the invention, in schema column attribute types (see FIG. 4A TYPE 445 and FIG. 4B DTD 470) for data elements, native form or binary form is preferred for all operations. Performance and access benefits are realized when accessing in native form or binary form, during accessing, storage, changing, transmitting, serialization, deserialization, and other processes and manipulations, due to the data elements being machine readable without conversion and without compression or decompression. While there can be column attribute types defined that are exceptions to this general rule, the exceptions should only be used sparingly as there is a performance loss.

Data from a database, as well as events, persistence, and other communication can all occur using the invention. This simplifies architecture as the same method is employed for all communication and persistence needs.

Middle layers that, just pass information utilizing the invention do not need programming alterations for changes such as columns or simple type changes to columns. The only layers that need to be programmatically modified are the consumers of the changed columns or new columns. This greatly reduces software brittleness.

Figure 1B:
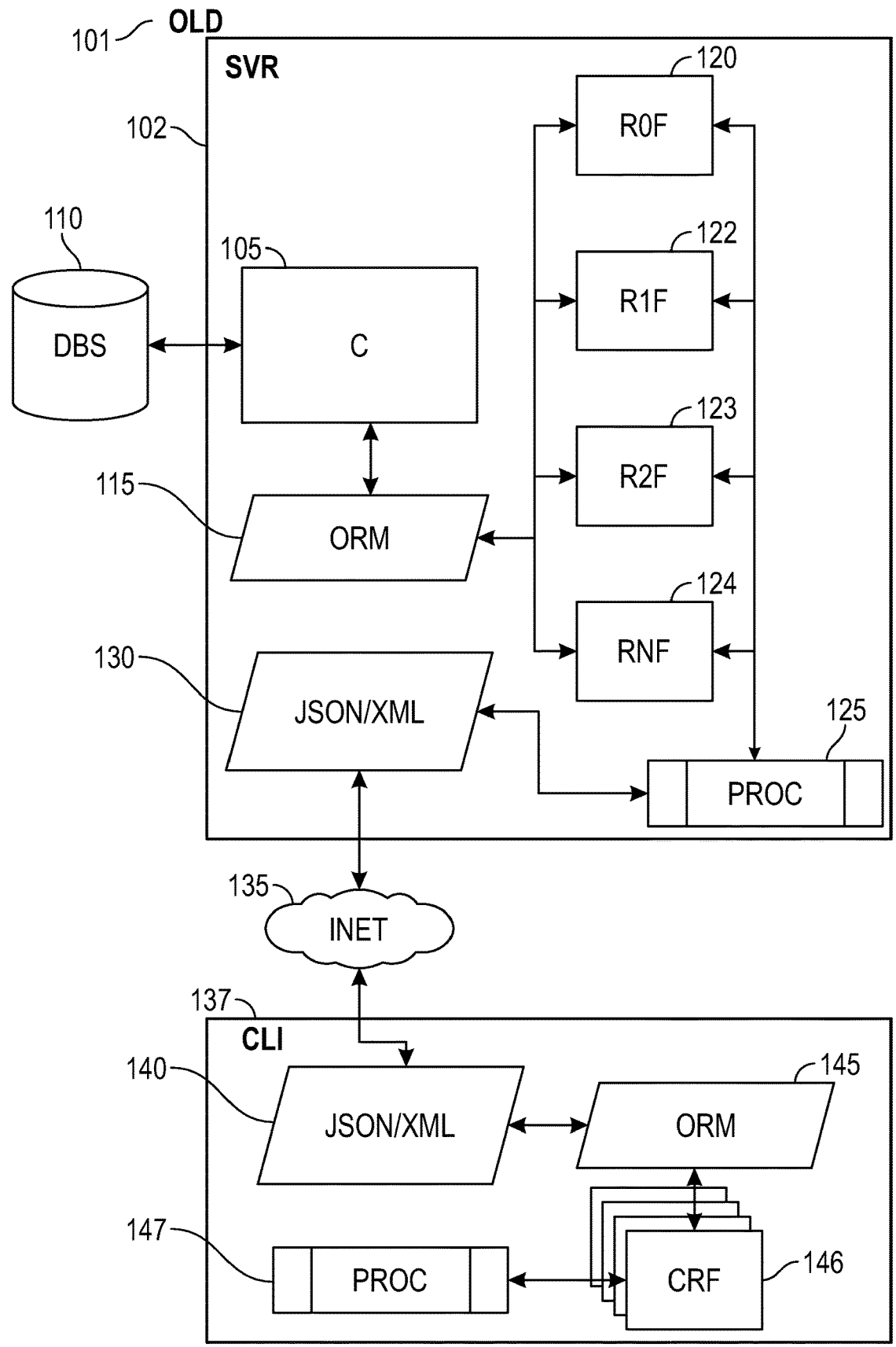

FIG. 1A and FIG. 1B are block diagrams demonstrating how the invention compares to traditional server/client architecture. While there are many complexities to programming communications between systems, the goal of these diagrams is to follow the general flow between the systems.

A typical CPU-intensive and bandwidth-intensive transmission from server to client in a traditional architecture, OLD 101 is shown in FIG. 1B:

The client requests information from the server.

The server SVR 102 requests the information via connection driver C 105 from connected database or databases DBS 110. The database responds by packetizing the data records response and creates a schema to interpret the rows of data. The server then has overhead of reprocessing the data using a object relational mapper or other internal format ORM 115. The data is typically stored very fragmented in memory row 0 fragment R0F 120 row 1 fragment R1F 122 row 2 fragment R2F 123 row n fragment RNF 124, typically centered around single rows of information or worse, single elements of information. From the mapper, the data is then processed PROC 125 and readied to send to the client using a format such as JSON/XML 130, taking more processing time from the CPU and consuming more memory. The column attribute (partial schema) is typically wrapped into every row and column of information. The server then sends the data consuming more bandwidth over the internet INET 135 to the client CLI 137.

The client CLI 137 receives the information from the server. The client then has to parse the data from JSON/XML 140, including the partial schema, one row at a time. The data is then reprocessed using an object relational mapper or other internal format ORM 145. The data is typically stored very fragmented CRF 146 in memory mirroring the server fragments row 0 fragment R0F 120 row 1 fragment R1F 122 row 2 fragment R2F 123 row n fragment RNF 124, typically centered around single rows of information or worse, single elements of information. Finally, the data is then available to be processed PROC 147 in some manner by the client.

In addition, due to the nature and complexity of data transfer, each communication requires custom complex software to interpret all of the data and typically exhibits software brittleness.

When the client transmits records to the server, the process described above is roughly followed in the reverse direction.

The improvement due to using the, invention NEW 150 is shown in FIG. 1A:

The client requests information from the server.

The server SVR 152 requests information via connection driver C 155 from the connected database or databases DBS 160. If the schema is unknown to the server, the connected database creates a schema for the result information. The connected database passes the information directly into a machine readable form on the server C 155. The data is then processed PROC 175. If the schema is unknown to the client, a single schema is sent to the client for how to interpret all rows of data. Rows of fixed data are packaged in memory as a single memory allocation. Dynamic data such as strings, images, videos, data blobs, etc. are sent with a variable length quantity followed by the raw machine data for each element FAST 180. The server then sends over the Internet the data consuming less bandwidth INET 185 to the client CLI 187.

The client CLI 187 receives the information from the server. If the schema is unknown by the client, a single schema is received for all rows and is interpreted defining the column attributes. All row information for fixed information is bulk read with no need for interpretation as it is already machine readable. The row information for the dynamic information is then bulk read for each element with little or no need for interpretation as it is already machine readable FAST 190. The client then processes PROC 197 the information.

When the client transmits records to the server, the process described above is roughly followed in the reverse direction.

Figure 2:
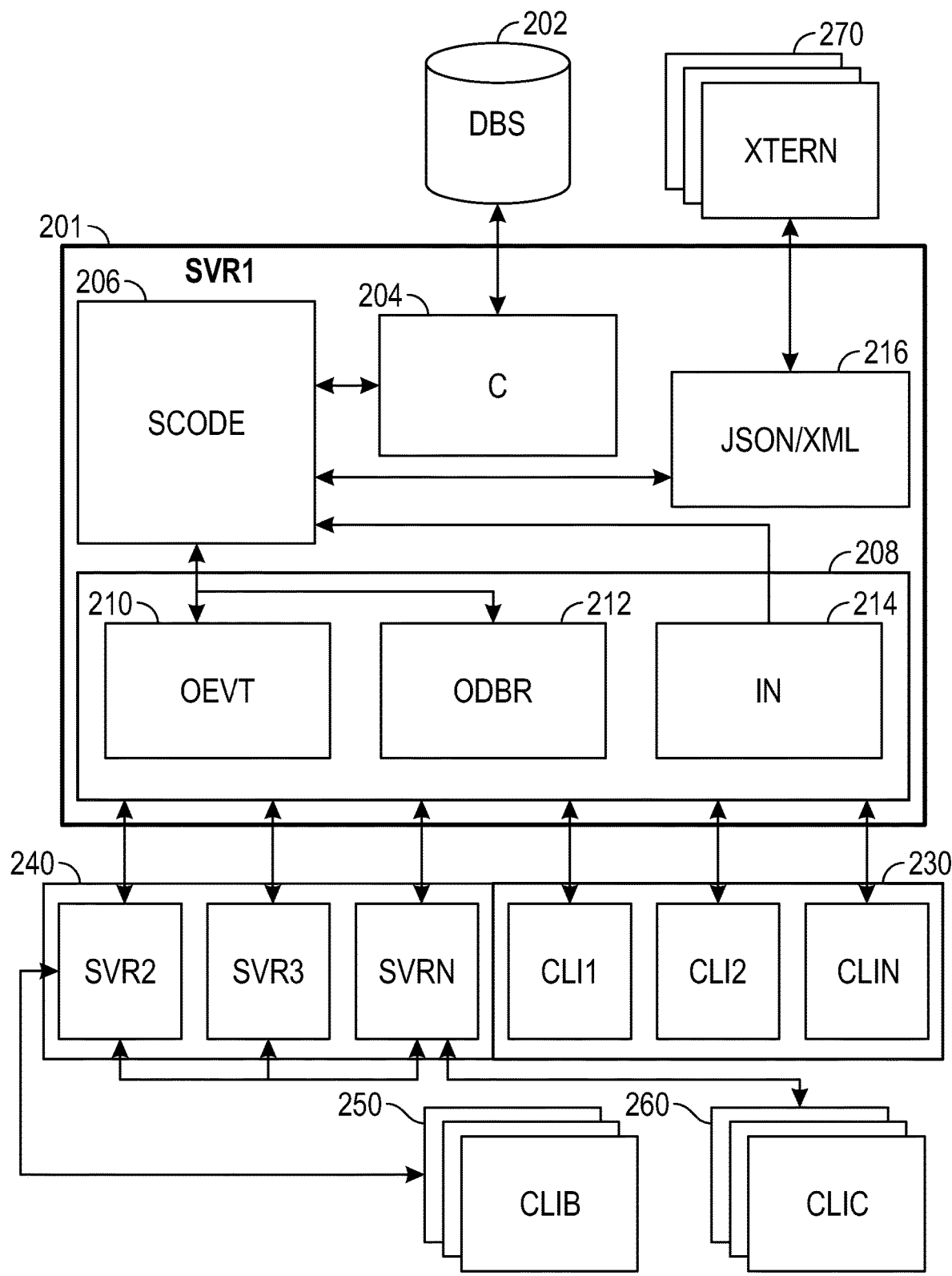
FIG. 2 is a block diagram demonstrating how the invention would be utilized.

FIG. 2 a block diagram illustrating the general flow between the systems and demonstrating how the invention would preferably be utilized.

Block 201 diagrams the internal structure of server 1 SVR1 that is connected to a database DBS 202. In a simple environment, there may not be other servers present and the portion of the diagram presenting multiple servers SVR2, SVR3, up to SVRN, can be ignored. In addition, some or all of the servers SVR2, SVR3, up to SVRN, represented in the diagram may not be full servers, and instead could be servlets, virtual machines, or other server components.

Database/Databases DBS 202 represents a database, multiple databases, database clusters, etc. For simplicity of illustration, the connection line is only drawn between server 1 SVR1 201 and PBS 202. One or more servers, etc. from server etc. SVR2, SVR3, up to SVRN in area 240 could also be connected to the DBS 202.

Server code using the invention SCOPE 206 is the code base that utilizes the invention. When that code base interacts with one, or more databases, it does so using the invention through the database interaction driver C 204, to and from DBS 202. In this server model, all communication is leveraging the invention, greatly simplifying the complexity of architecture.

Block 208 presents incoming and outgoing data from the server where all communication is leveraging the invention.

Events can utilize the invention OEVT 210 greatly simplifying architecture as the use of database records ODBR 212 can follow the same communication flow, even if processing is handled differently. Outgoing database records could also be modified prior to sending to include additional columns or the removal of columns if necessary.

Lastly, incoming information utilizing the invention from external sources can occur IN 214 also using the invention. All server interaction with row and column data occurs in a uniform efficient methodology.

It is important to note that not all outgoing methods may be used, depending on the implementation of the invention. Also, there could be additional outgoing methods. Lastly, there may more incoming methods or no incoming information eliminating the need for IN 214.

The client is exhibited as client 1 CLI1 230, client 2 CLI 2, up to client n CLIN. All clients follow the same pattern. The communication between server and client also utilizes the invention for both consumption and transmission of information, thus, greatly reducing the complexity of code and providing a uniform high performance method of data transfer through all portions of the code base. Additional clients can follow the same pattern and are presented in the diagram as Client 2 CLI2 and Client n CLIN.

Server to server communication can also occur as presented as Server 2 SVR2 240, Server 3 SVR3, up to Server n SVRN. The communication between servers also utilizes the invention for both consumption and transmission of information. Thus, greatly reducing the complexity of code and providing a uniform high performance method of data transfer through all portions of the code base. Additional servers can follow the same pattern and are presented in the diagram as Server 2 up to Server n. In addition, some or all of the servers represented in the diagram may not be full servers, and instead could be servlets, virtual machines, or other server components. Note for simplicity, potential lines to database, multiple databases, database clusters, etc. DBS 202 are not drawn. One or more servers from 240 could also be connected to DBS 202.

Client Group B CLIB 250 and Client Group C CLIC 260 can present additional communication between different servers and client groups.

Lastly, JSON, XML, and other formats are utilized through a simple coercion JSON/XML 216 to and from other sources, in case the clients and servers XTERN 270 may not utilize the invention.

Figure 3:
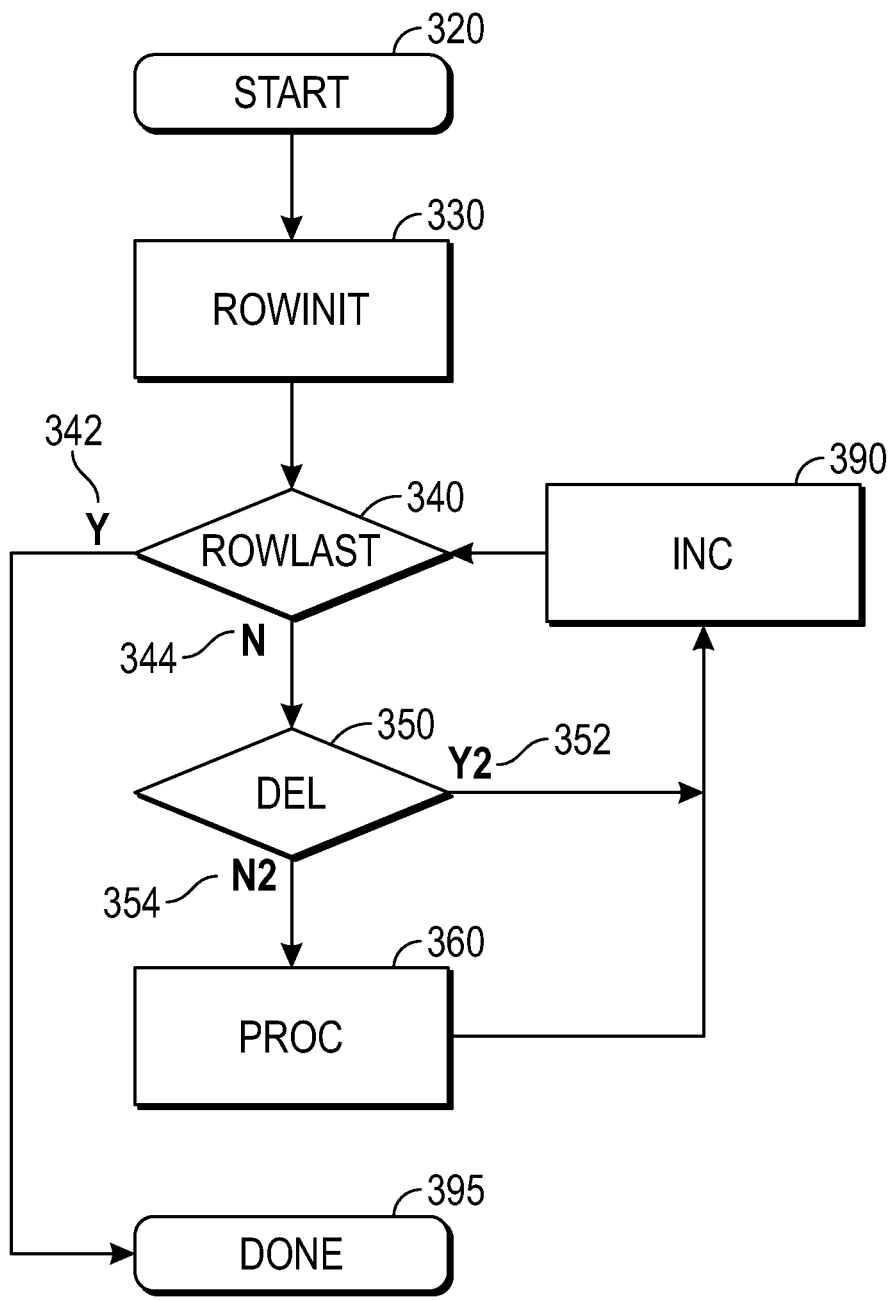
FIG. 3 is a flow chart outlining the process a developer utilizing the invention follows for accessing row/column information.

FIG. 3 is a flow chart outlining process a developer utilizing the invention follows for accessing row/column information.

While this invention does not require connection to a database, the calling conventions for data access are consistent with database access frameworks such as ADO.NET and JDBC. By keeping the calling conventions consistent with other frameworks, there is an immediate familiarity by the software developer, minimizing the effort required to utilize the invention.

Unlike ADO.NET and JDBC, direct access to the row number is preferred rather than using an iterator. While it is preferred, an iterator can still be utilized.

After one or more records have been imported, serialized, or initialized and the data is ready to be consumed, the processing loop is started START 320.

The variable "row" is initialized to zero ROWINIT 330. There are some cases where the "row" could be a number other than zero, for example the software developer may only desire records after a specific date or after a known row number.

A check is performed comparing the "row" to the total number of rows, expressed as "row" greater than or equal to the total number of rows ROWLAST 340. Because row numbers start at zero, if the "row" value is greater than or equal to the total number of rows Y 342, then processing is complete DONE 395.

If the "row" value is not greater than or equal to the total number of rows, then the flow continues through N 344. A check is then performed by calling a function requesting if the row is deleted DEL 350. If the row is deleted Y2 352, then "row" is incremented INC 390 and the loop continues with a check to see if "row" is greater than or equal to the total number of rows ROWLAST 340.

If the row is not deleted, flow continues through N2 354. The code utilizing the invention can then process PROC 360 the row's information. Processing could include getting and/or setting column values.

Once the row has been processed, the "row" is incremented INC 390 and the loop continues with ROWLAST 340.

Figure 4A:
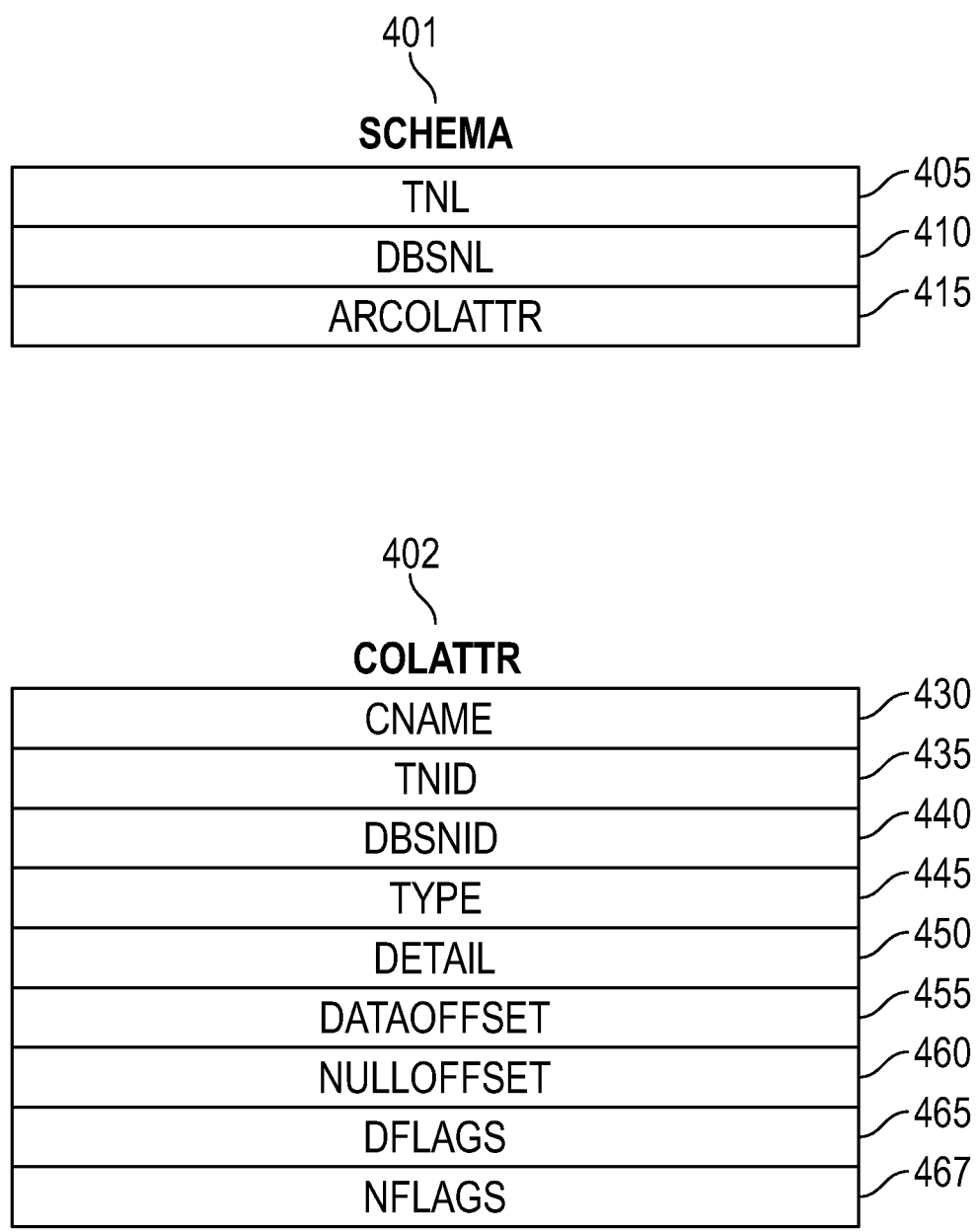
FIG. 4A contains block diagrams describing the schema definition and column attributes.

FIG. 4A contains block diagrams describing the schema definition and column attributes. The focus moves away from utilization of the invention and begins the description of the internal structure of the invention.

Referring to the schema block entitled SCHEMA 401, because many data sources are database related, a column of data could have a table name list lookup TNL 405 and a database schema name list lookup DBSNL 410, to help further refine the column. The table name list TNL 405 information is stored such that it can be quickly looked up by its lockup identifier. That way, if multiple columns use the same table name, the data is not replicated and is easily found by looking up the identifier that then resolves to the name. Likewise, with the database schema name list DBSNL 410, information is stored such that can be quickly looked up by its lookup identifier. That way, if multiple columns use the same database schema name, the data is not replicated and is easily found by looking up the identifier that then resolves to the name. Both TNL 405 and DBSNL 410 are optional, but are included the presently preferred embodiment of the invention.

In the presently preferred embodiment of the invention, all text attributes for the schema are serialized using UTF-8 format.

The schema definition SCHEMA 401 contains a set of column attributes ARCOLATTR 415. The set of column attributes ARCOLATTR 415 are used to define all of the details related to a column. The set of column attributes matches the columns represented. For example, if there are ten columns, there are ten column attributes.

Referring to the column attributes block COLATTR 402, each column has the following detail:

An element column name CNAME 430. Examples of column names include first_name, last_name, customer_id, address, zipcode.

In practical embodiments of the invention, the column name could be omitted and the only way to access a column would be by column identifier rather than name.

The lookup of the table name TNID 435 references the lookup identifier contained in the table name list TNL 405 of the block SCHEMA 401.

The lookup of the database schema name DBSNID 440 references the lookup identifier contained in the database schema list DBSNL 410 of the block SCHEMA 401. In the presently preferred embodiment of the invention, the typical way in text to access a specific column of information is by requesting dbschema.table.column_name. In many cases, use of shorthand table.column_name or just column_name can be used if there are no other duplicates. For example, a column could be accessed by northeast.customer.name, customer.name, or just name if unique.

If looking through the columns to find a match against the dbschema.table.column_name or table.column_name, or just column_name. The column number is then known and is the offset into the set of column attributes ARCOLATTR 415.

The column data type TYPE 445 is used to define the data type contained in the column. The current identifiers are defined in data type definitions DTD 470 of FIG. 4B.

The type detail DETAIL 450 is required when data type is TYPE_CHAR or TYPE_FIXEDBINARY. In these cases, type detail is populated with the number of fixed bytes for the fixed byte size of the column. As a convenience, in presently preferred embodiments of the invention, the type detail DETAIL 450 contains the number of bytes for any column of fixed, for quick lookup.

Data column offset DATAOFFSET 455 serves a dual purpose. For fixed columns, this attribute, data column offset DATAOFFSET 455, contains the number of bytes offset into a row to access the desired fixed data element. More details for fixed columns follow and are also covered in FIG. 5.

For dynamic columns, the data column offset DATAOFFSET 455 holds the dynamic column number. More details for dynamic columns follow and are also covered in FIG. 6.

While this field is optional because it can be computed on the fly, preferred embodiments utilize this attribute.

Of course, fixed and dynamic row and column data can be accessed using other methods beyond calculating offsets.

It is presently preferred that null offset NULLOFFSET 460 is used only for columns that are fixed. fixed columns are flagged as nullable by NFLAGS 467. The data null offset NULLOFFSET 460 is used for convenience to quickly lookup if the element is null. More details for nulls will be covered shortly and are also covered in FIG. 5. While this field is optional because it can be computed on the fly, preferred embodiments utilize this attribute.

Dynamic flag Element+Flags DFLAGS 465 is used for assistance for the type of information contained in the column. In the presently preferred embodiment, only bit 0 is used and if set high (1), defines the column data as a dynamic column. This would be set on any of the dynamic columns, as defined in data type definitions DTD 470 of FIG. 4B. While this field is optional because it can be computed on the fly, preferred embodiments utilize this attribute.

For Nullable+Flags NFLAGS 467, only bit 0 is currently used, and if set high (1), it defines the column as being able to contain null values. For dynamic columns, when requesting an element value for a specific row and column, if the element is null, the caller is returned a null pointer. For fixed data elements, an additional programming function for a specific row and column is called to determine whether the element is null.

In preferred embodiments of the invention, additional header information could be contained in the schema block SCHEMA 401 such as containing more information as to the data source, connection properties, table properties, etc.

In preferred embodiments of the invention, additional column attribute information could be contained in column attribute block COLATTR 402 such as containing such as lookup/index information, precision, description, etc.

FIG. 4B is a block diagram containing a list and details of some of the possible data types as discussed in schema definition FIG. 4A data type TYPE 445 utilized by the invention.

Listed below are the presently preferred data types for columns utilized by the invention. As time continues, more data types will be defined, and an official registrar should be periodically referenced to stay current.

It is also important to note that the translation of these data types into numbers is utilized in the presently preferred embodiment, and that the identifier for a data type could be something completely different, such as text, incrementing number, CRC, MD5 code, hash code, etc.

In a practical embodiment of the invention, for fixed columns and text, big-endian notation is assumed as default. In some embodiments of the invention, more data types would be created in data type definitions DTD 470 for any fixed number greater than one byte utilizing little-endian byte format. In the optimal embodiment, the CPU's native processing format could be big-endian or little-endian, and the default data type definitions DTD 470 or flags adjusted accordingly on creation of a new schema. If the data is then serialized and sent to a computer with opposing native-endian usage, there would be a slight processing overhead penalty for getting and setting each data element.

In optimal embodiments of the invention, there could be more definitions in data type definitions DTD 470 or a flag utilized to indicate unsigned in the column attributes COLATTR 402 for the unsigned family of tinyint, smallint, integer, and bigint. Unsigned numbers are only positive.

Data types define the type of data that is contained in a column. If the data is identified as being fixed in the descriptions below, then the column is defined as containing fixed data elements and the specified amount of bytes is included in the definition. If the data is identified as being dynamic in the descriptions below, then the column is defined as containing dynamic data elements.

TYPE_BOOLEAN 471 is a fixed data type identifier, and in the presently preferred embodiment, is set to consume one byte in of space in FIXROW 505 (see FIG. 5) to reduce complexity. If the value is zero, the result would be equivalent to false. If the value is non-zero, the result would be equivalent to true. In an optimal embodiment of the invention, multiples of eight booleans on a single row would consume a byte per set of eight in FIXROW 505. In the presently preferred embodiment, the type identifier is 1.

TYPE_TINYINT 472 is a fixed integer data type identifier and in the presently preferred embodiment, is set to consume one byte of space in FIXROW 505. Valid ranges for the data are −128 to 127. In the presently preferred embodiment, the type identifier is 2.

TYPE_SMALLINT 473 is a fixed integer data type identifier and in the presently preferred embodiment, is set to consume two bytes of space in FIXROW 505. Valid ranges for the data are −32768 to 32767. In the presently preferred embodiment, the type identifier is 3.

TYPE_INTEGER 474 is a fixed integer data type identifier and in the presently preferred embodiment, is set to consume four bytes of space FIXROW 505. Valid ranges for the data are −2,147,483,648 to 2,147,483,647. In the presently preferred embodiment, the type identifier is 4.

TYPE_BIGINT 475 is a fixed integer data type identifier and in the presently preferred embodiment, as set to consume eight bytes of space in FIXROW 505. Valid ranges for the data are (2 raised to the 63rd power) −1 to (2 raised to the 64th power)−1. In the presently preferred embodiment, the type identifier is 5.

TYPE_FLOAT 476 is fixed floating data type identifier and in the presently preferred embodiment, is set to consume four bytes of space in FIXROW 505. In the presently preferred embodiment, the type identifier is 6.

TYPE_DOUBLE 477 is a fixed floating data type identifier and in the presently preferred embodiment, is set to consume eight bytes of space in FIXROW 505. In the presently preferred embodiment, the type identifier is 7.

TYPE_DATE 478 and TYPE_TIMESTAMP 479 are fixed data type identifiers and in the presently preferred embodiment of the invention, are stored as eight bytes of space in FIXROW 505. In the presently preferred embodiment, it is defined as a floating point number and is the number of milliseconds since Jan. 1 1970, 00:00:00 GMT. In the presently preferred embodiment, the type identifiers are 8 for TYPE_DATE and 9 for TYPE_TIMESTAMP.

TYPE_VARCHAR 480, TYPE NVARCHAR 481, TYPE_LONGNVARCHAR 482 TYPE_LONGVARCHAR 483, TYPE_NCHAR 484, TYPE_SQLXML 485, and TYPE_NUMERIC 486 are dynamic data type identifiers and in the presently preferred embodiment of the invention, these dynamic types are typically stored as dynamic UTF-8 strings. In some embodiments of the invention, TYPE_NUMERIC is preferably supported as a complex fixed byte size. In some embodiments of the invention, UTF-8 may not be the text format, and could be more reflective of the type: definition and identified as a fixed data type. In the presently preferred embodiment, the type identifier is 10 for TYPE_VARCHAR, 11 for TYPE_NVARCHAR, 12 for TYPE_LONGNVARCHAR, 13 fox TYPE_LONGVARCHAR, 14 for TYPE_NCHAR, 15 for TYPE_SQLXML, and 16 for TYPE_NUMERIC.

TYPE_BLOB 487, TYPE_BINARY 488, and TYPE_VARBINARY 489 are dynamic data type identifiers and define dynamic data consisting of raw binary data. In the presently preferred embodiment, the type identifier is 17 for TYPE_BLOB, 18 for TYPE_BINARY, and 19 for TYPE_VARBINARY.

TYPE_UUID 490 is a fixed data type identifier and in the presently preferred embodiment, is set to 16 bytes of space in FIXROW 505. This unique identifier is stored in standard universally unique identifier format. In a presently preferred embodiment, the type identifier is 20.

TYPE_CHAR 491 is a fixed data type identifier and allocates the number of bytes in FIXROW 505 set by the schema definition type detail DETAIL 450 (see FIG. 4A). In some embodiments of the invention, the string is stored in UTF-8 format with the end byte as zero indicating termination. The only exception to the zero termination is if the UTF-8 string is equal to the maximum number of bytes in the type detail, in which case, the entire contents of the block are utilized for the string. In the presently preferred embodiment, the type identifier is 21.

TYPE_SUB 405 is a dynamic data type identifier that defines a subschema+fixed+dynamic utilizing the invention. Utilizing this type, it is possible to have sub-rows of information defined, with different schemes effectively creating hierarchies of data. In the presently preferred implementation of the invention, upon serialization/deserialization, the TYPE_SUB branches are also serialized/deserialized into a data object or data structure form, allowing immediate hierarchical access to all sub-rows and columns. In the presently preferred embodiment, the type identifier is 22.

TYPE_FIXEDBINARY 496 is a fixed data type identifier that has the number of bytes in FIXROW 505 (see FIG. 5) to be set by the schema definition type detail DETAIL 450. This is a binary data block and typically cloned for both setting and getting the value to insure boundary checking is performed and data corruption cannot occur. In the presently preferred embodiment, the type identifier is 23.

Additional data types could be reserved, as well as user defined data types. In some embodiments of the invention, a request for a type number should be made to an official registrar so that others do not use the same data type definition for a different purpose.

In some embodiments of the invention, fewer data types could be defined, such as a single type for all types of integers, and type detail DETAIL 450 (see FIG. 4A) could be utilized to define the number of bytes for the fixed data.

In some embodiments of the invention, fewer types could be defined such as a single type for both unsigned and signed integers, with a flag attribute defining the integer as either signed or unsigned.

Figure 5:
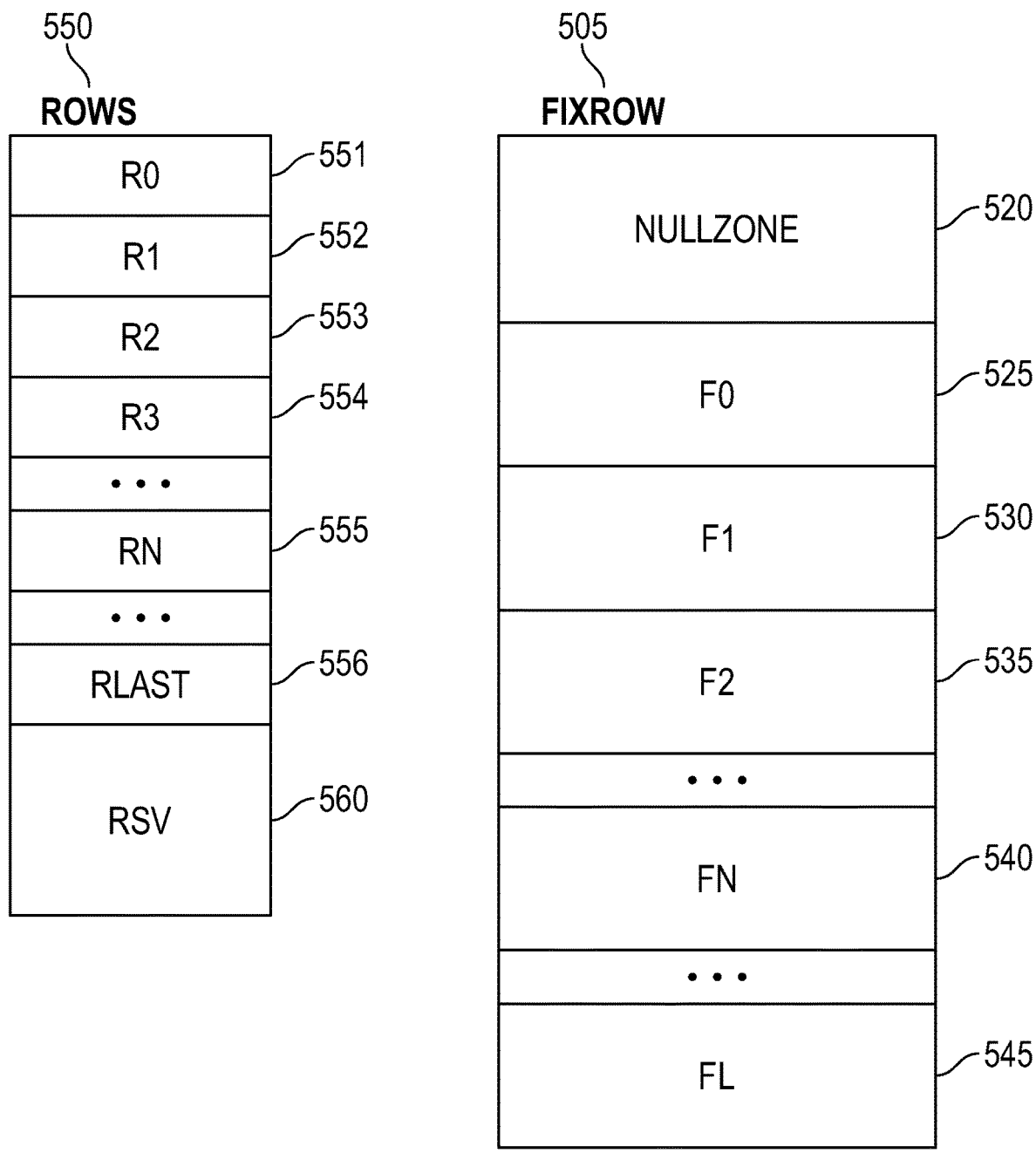
FIG. 5 contains block diagrams that focus on rows of fixed data elements and a single row of the fixed data elements.

FIG. 5 contains block diagrams that focus on rows of fixed data elements and a single row of the fixed data elements. The fixed data allocation contains data elements that are fixed in byte size.

In the presently preferred embodiment of the invention, the fixed row access utilizes memory allocation in one or more fixed length allocations organized by rows block ROWS 550, which is preferred for memory storage. In another embodiment of the invention, several allocations could occur, for example by row, or even by element. In the presently preferred embodiment, by having all the columns and rows for fixed data as one fixed length allocation block ROWS 550, memory fragmentation is greatly reduced, access is efficient, and serialization is optimal.

Referring to the block entitled ROWS 550, row zero R0 551 data comes first, and column 0 of row 0 comes before column 1 of row zero. Row 1 R1 552 comes next, with row 2 R2 553 following, then row 3 R3 554. This same iteration process continues for any arbitrary row n RN 555, and lastly to the last row RLAST 556 of fixed data elements. In addition, there can be reserved space at the end for expected growth RSV 560. If rows are added beyond the maximum allocation, a new memory allocation is reserved with hints on expected growth rate by the caller. The data then is copied to the new memory allocation and the old is released. It is worth noting that small sets with a total row count of 0, 1, 2, 3, or 4 can also exist where, RLAST 556 may not exist, if there is no row RN 555, R3 554, R2 553, R1 552, and/or R0 551, because the row number is greater than or equal to the total number of row.

The block for a single fixed row entitled FIXROW 565 shows how a single row of fixed data elements is stored in memory. If there are no fixed columns defined in the schema, then no allocation for fixed data elements is necessary. The remainder of this section focuses on if there are fixed columns.

Because FIXROW 505 contains a row of fixed data elements, it may be more intuitive to conceptualize FIXROW 505 as being horizontally oriented.

The null zone NULLZONE 520 represents the entire null zone as detailed further below. The null zone is used for any column of fixed data that has a schema column attribute declaring that it is nullable NFLAGS 467 (see FIG. 4A). The null zone is used to indicate whether a fixed data element at specified row and column is currently null.

In the presently preferred embodiment of the invention, the null zone definition NULLZONE 520 is the first section utilized for fixed data in the presently preferred embodiment of the invention. In the presently preferred embodiment of the invention, to figure out the amount of bytes needed for the null zone, on initialization of the schema, a total count is performed for all column attributes COLATTR 402 (see FIG. 4A) that are fixed and have nullable set NFLAGS 467. If there is one or more columns declared as nullable, the total bytes needed for the nullzone equals the (number of nullable columns minus 1) divided by 8, rounded up to the nearest integer. Example 1: If there are three fixed data columns with nullable items, then the total bytes is one. (3−1)/8=0.25 rounded up=1. Example 2: If there are twenty-one fixed data columns with nullable items, than the total bytes is three. (21−1)/8=2.5 rounded up=3. While there may be some unused bits using this technique, it insures that all fixed data element row in is contained in one chunk, which is preferred.

In practical embodiments of the invention, the null zone may be contained in its own null zone allocation. Determining if an element is null, setting if an element is null, and serialization would have to be adjusted accordingly for the methodology of accessing the null zone allocation rather than being part of the fixed data allocation.

In other practical embodiments of the invention, a completely different technique could be utilized to determine if an element is null, setting an element to null, and serialization of null elements.

Setting and getting null state of a nullable item and access to the null zone NULLZONE 520 is as follows:

A function is used to figure out if a fixed data element is currently null, an example function name for checking is nullCheck(row, column). The column requires a lookup into the schema information to determine the proper of set based off of the number of fixed nullable items in the row, and this element's offset into that number. For example, the column could be eight, but this may be the third nullable fixed item. The result of the function check being true would indicate that the element is null. The function itself first finds the byte offset into the null zone on the row. Consider the variable "e" NULLZONE 520 to contain the nullable fixed element column number on a fixed element row starting column zero. "Byte offset"="e" divided by 8 rounded down to the nearest integer. Shorthand for writing rounding down is to use int(value). In this case, the shorthand would be by offset equals int("e"/8). Byte, offset only deals with the offset into the null zone for any given row. For obtaining or setting data for a specific row, the following formula is applied: "fixed final offset"=(("row number") times ("fixed row size"))+ ("byte offset") where "row number" is the fixed element row number starting at zero. Refer to "fixed row size" FL 545 for calculation.

Now that the byte number has been resolved as "byte offset", the bit number must be resolved. The function is expressed with the following equation: "bit number"="e" minus (("byte offset") times 8).

Example 1: The third nullable item on row 6, with the assumption that the "fixed row size" is 20 bytes, "e"=2 as nullable items start at zero. 2 divided by 8 equals 0.25 and rounded down equals 0.

"byte offset"=0

"fixed final offset"=("row" times ("fixed row size"))+("byte offset")

"fixed final offset"=(6 times 20) plus 0
"bit number"="e"−(("byte offset") times 8)
"bit number"=2−(0 times 8)=2

Example 2: For the thirtieth nullable item on row 15, with the assumption that fixed row size is 18 bytes, "e"=29. 29 divided by 8=3.625 and rounded down=3.
"byte offset"=3
"fixed final offset"=("row" times "fixed row size")+("byte offset")
"fixed final offset"=(15 times 18)+3
"bit number"="e"−(("byte offset") times 8)
"bit number"=29−(3 times 8)=5

The "fixed final offset" is the offset, in bytes, to the specified fixed nullable column and row. In addition, the "bit number" is now known.

For reading the nullable value, the fixed address ROWS 550+"fixed final offset" dictates the final address to be read. The byte at that address is read. After reading the byte, bitwise AND is performed with (two raised to power of the "bit number"). If the resulting value is non zero, then the element is null. Programming optimizations are assumed and drastically improve this concept focusing on performance. These optimizations could include, any or all of the following: bitwise AND operations, bitwise OR operations, bit shifting, other bit operations, modulus operations, integer math optimizations, low level machine instruction, registers, etc.

For the presently preferred embodiment of the invention, the "byte offset" and "bit number" are determined upon schema initialization to reduce computational overhead and looping for the entire lifespan of the data utilizing the invention.

A separate simple function is used for setting nullable values. For setting the value to null, the fixed memory address ROWS 550+"fixed final offset" dictates the final address. After reading the byte, bitwise OR is performed with (two raised to power of the bit number). The resulting value is then stored back into the location, pointed in memory from where it was read. For clearing the null state, the fixed memory address ROWS 550+"fixed final offset" dictates the final address. After reading the byte, a bitwise AND is performed with the function: (255−(two raised to power of the "bit number")). The function thereby sets the bit at the specified position to zero, but leaves other bits intact. The resulting value is then stored back into the location. Programming optimizations are assumed and drastically improve this concept focusing on performance. These optimizations could include any or all of the following: bitwise AND operations, bitwise OR operations, bit shifting, other bit operations, modulus operations, integer math optimizations, low level machine instruction, registers, etc.

After the null zone NULLZONE 520, the fixed element column values for row 0 F0 525 are stored. The first is fixed data element 0 F0 525. The number of bytes required for fixed data element 0 depends on the lookup of data type definitions DTD 470 stored in the data type TYPE 445 attribute. Fixed data element 0 is where the first fixed value is retrieved and stored. In the presently preferred embodiment of the invention, the format for getting and setting the data is in big-endian format. The data offset DATAOFFSET 455 for fixed data element 0 is always just the NullPadding Offset. The data offset is the byte offset into a single row to access a specific column's data.

In another embodiment of the invention, more types would be created in data type definitions DTD 470 or a flag could be utilized for any fixed number greater than one byte, utilizing little-endian byte format. The CPU's native processing format could be big-endian or little-endian and the default creation types adjusted accordingly on creation of a new schema. If the data is then serialized and sent to computer with opposing native-endian usage, there would be a slight penalty for reading and writing each data element.

In another embodiment, more types would be created in data type definitions DTD 470 or a flag could be utilized for the unsigned family of tinyint, smallint, integer, and bigint. Unsigned numbers are only positive.

After element 0, if there is another fixed data element, the element 1 F1 530 is created and initialized. The data offset DATAOFFSET 455 is calculated by taking the previous element's offset and adding the previous element's byte size. Typically, all the computations for offset within a row are performed when the schema is initialized and data offset is calculated DATAOFFSET 455.

To continue the thought process that would occur to initialize the data offset DATAOFFSET 455, the offset for fixed data element 2 F2 535 would be calculated in the same manner as for element 1 F1 530, by taking the previous element's offset and adding the previous element's byte size. The computation, in the presently preferred embodiment of the invention, is performed on schema initialization and is available in data offset DATAOFFSET 455. An arbitrary fixed data element "n" is represented by FN 540, and computation occurs in the same manner.

The last fixed data element of a row is represented in FL 545. The "fixed row size" is then computed by taking the last element's offset FL 545 and adding the last element's size.

Once the fixed data elements row size is known, computing the offset to any specific row of fixed data is performed by using the following presently preferred method: "row offset"=("row number") times ("fixed row size"). Continuing to a specific element follows the same pattern by adding the fixed data element's data offset DATAOFFSET 455.

It is worth mentioning that F0 525, F1 530, F2 535, and/or FN 540, may not all exist if the column listed, starting at column 0, in FIG. 5, is greater than or equal to the total number of columns. The columns are only presented to make a more complete example. In the case there is only F0 525, FL 545 and F0 525 are the same element.

By having all offsets for each column and row as simple mathematical formula, it is fast and easy to traverse the entire fixed data set as a whole. For a CPU, this achieves high native performance with minimal overhead.

Figure 6A:
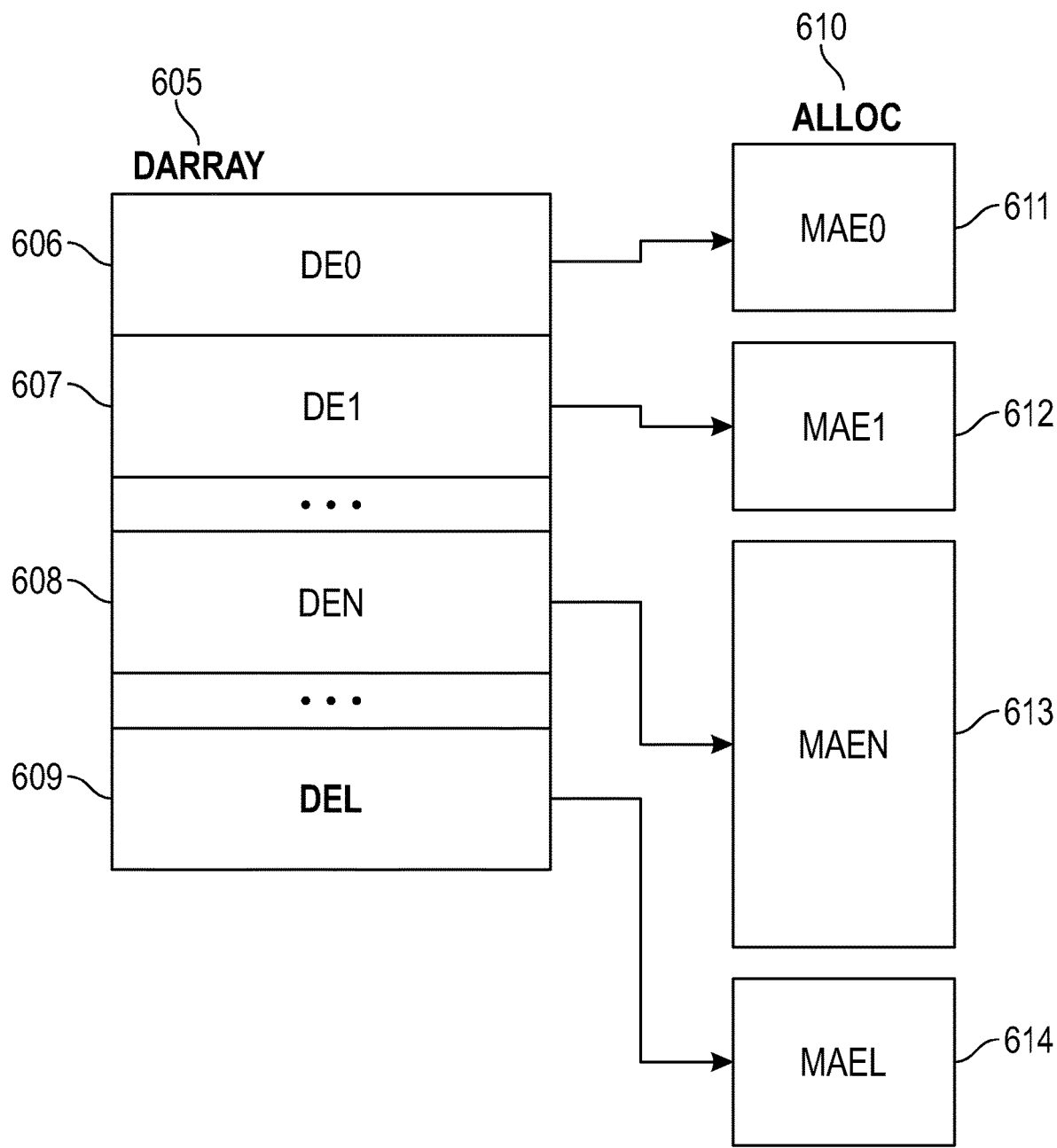
FIG. 6A is a block diagram outlining access to dynamic data elements.

FIG. 6A is a block diagram outlining access to dynamic data elements, which are data elements that are variable in byte size.

dynamic data elements are variable in byte length, utilize multiple allocation systems, and typically change often. It is preferred that a pointer is utilized to point at the actual dynamic data element. For the majority of cases, the pointer to the dynamic data element points to a low-level memory allocation. In presently preferred embodiments, there are exceptions to this general rule such as TYPE_SUB 495 (see FIG. 4B). In cases such as TYPE_SUB 495, instead of pointing to a memory allocation, the pointer could point to deserialized data in the form of one or more objects, structures, typedefs, containers, offset sets, sets, etc. so that the user of the invention has direct access to the contents in a deserialized data form. Thus, the term 'allocation' shall be interpreted to include memory allocation, object construction, structure initialization, etc. In preferred embodiments of the invention, more exceptions could be plugged in, allowing direct utilization of the specific data type. Examples of additional exceptions are compression/decompression and encryption/decryption.

The category of dynamic data elements follows a different set of rules and conditions to obtain and set elements. Because sizes of are variable and can typically change frequently, it is best for each element to have its own memory, object, or structure allocation ALLOC 610.

Dynamic Elements contain data elements that are variable in byte size. While the preferred embodiment of the invention uses a single concurrent set of pointers to contain all the elements, the organization row in this diagram is a more conceptual view of the data and there could be different approaches in other embodiments to accomplish the same goal.

Regardless of the programming language available for programming the invention, the concept is consistent. The presently preferred embodiment uses a single dimensional concurrent set of pointers that point to all of the dynamic data elements DARRAY 605. In sophisticated object oriented languages, there is typically a type of concurrent set of pointers that can be dynamically re-sized. For simpler languages, typically a library could be used to manage the dynamic data element set of pointers. If no library is available, there are many resources available to programmers on how to build a managed concurrent set of pointers.

In the block diagram of FIG. 6A, dynamic data element 0 DE0 606 points to the allocation for dynamic data element 0 MAE0 611; dynamic data element 1 DE1 612 points to the allocation for dynamic data element 1 MAE1 612; for arbitrary dynamic data "n", element "n" DEN 608 points to the allocation for dynamic data element n MAEN 613. For the last dynamic data element, dynamic data element last DEL 609 points to the allocation for dynamic data element last MAEL 614. It important to note that there may be dynamic data elements with a null pointer if the column is defined as nullable, in which case there would be no allocation in ALLOC 610.

It is also worth mentioning that DE0 606, DE1 607, and/or DEN 608 may not exist if the total rows or total columns is less than the dynamic data element number listed FIG. 6A presents many dynamic data elements for a more complete example. In the case that there is only one fixed element DEL 609 and DE0 606 are the same element.

When the schema is initialized, "dynamic row size" is computed by counting the total number of dynamic columns from the set of column attributes ARCOLATTR 415. Dynamic data types are listed in data type definitions DTD 470 (see FIG. 4B) with the indicator for type definition stating dynamic.

In the presently preferred embodiment of the invention, in addition, bit zero is set to 1 for the dynamic data element+ Flags byte DFLAGS 465 (see FIG. 4A).

Figure 6B:
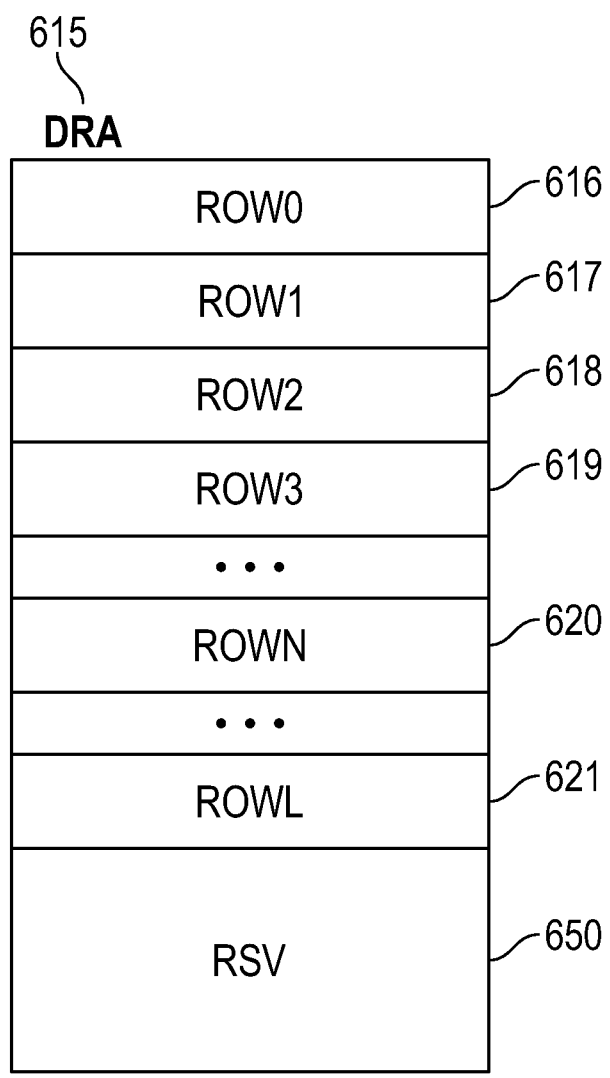
FIG. 6B is a block diagram outlining access to dynamic data elements organized by row. While the presently preferred embodiment of the invention using a single concurrent set of pointers to contain all the elements, the organization by row in this diagram is a more conceptual view of the data.

FIG. 6B is a block diagram outlining access to dynamic data elements organized by row. Dynamic data elements contain data elements that are variable in byte size. While the preferred embodiment of the invention uses a single concurrent set of pointers to contain all the elements, the organization by row in this diagram is a more conceptual view and there could be different approaches in other embodiments to accomplish the same goal.

In the presently preferred embodiment, on initialization of the dynamic data elements, the concurrent set of pointers is created by taking the "dynamic row size" multiplying it by the number of rows. In addition, there could be reserved space set aside in dynamic data element row size increments if the total number of records is expected to grow RSV 650. Note that the data is preferably one continuous set as demonstrated in DRA 615. While the row count could be less than five, in the diagram for DRA 615, it is assumed that the total number of rows is greater than four. The rows are listed as row 0 ROW0 616, row1 ROW1 617, row 2 ROW2 618, row 3 ROW3 619, arbitrary row n ROWN 620, and row last ROWL 621. For each dynamic data element, a pointer to the allocation, object, or structure is populated. If the attribute is nullable and the value is null, the element is populated with null.

In another embodiment of the invention, rather than being a concurrent set of pointers the user could pass in the optimum container type for the expected use case.

In the presently preferred embodiment, finding the specific column and row is performed by a low level request function such as a function named getDynamic(row, column). The preferred formula is "row offset"=("row number") times ("dynamic row size").

Consider variable "e" utilized as the dynamic data column number. To resolve "e" a lookup into the set of column attributes ARCOLATTR 415 (see FIG. 4A) to determine the proper offset based off element "e"'s dynamic column number. In preferred embodiments, this is pre-computed on initialization and is provided in DATAOFFSET 455. For example, the column in the schema set could six, but "e" may be the second dynamic data element in the row, so "e"=2.

From there the equation: "dynamic final offset"=("row offset") plus "e". Thus, "dynamic final offset" is determined by taking the "row offset" and adding "e". The "dynamic final offset" provides the appropriate index in the concurrent set of pointers DARRAY 605 (see FIG. 6A.). Getting or setting the specific allocation is performed by accessing the pointer to then access the allocation, object, or structure, etc. depending on language and data type. Note for nullable items that contain null, the pointer or object will be null. On setting, if a column attribute is defined to not contain nullable items, and a null is passed in, an error is produced.

Figure 7:
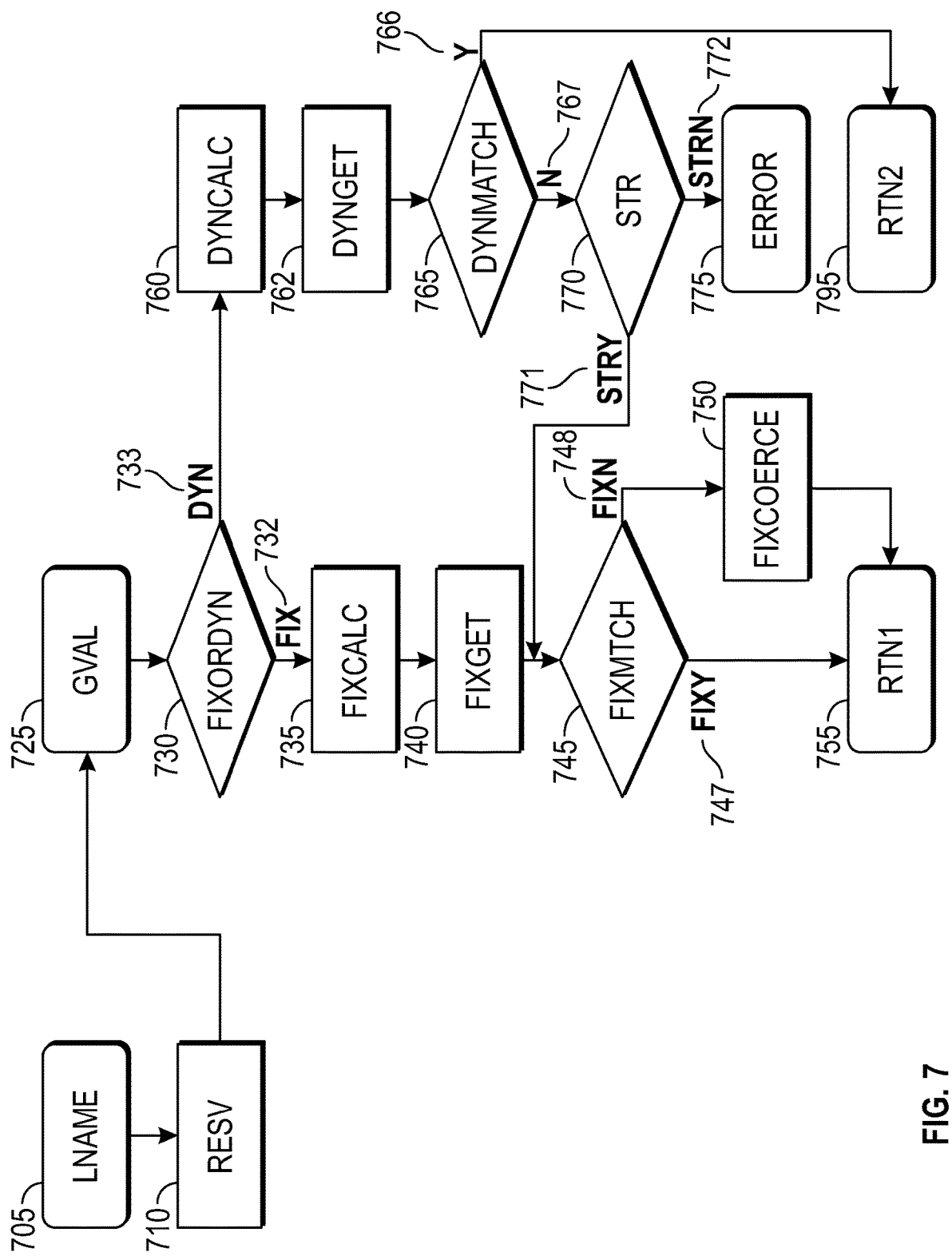
FIG. 7 is a flow chart for getting row and column values.

FIG. 7 is a flow chart for getting or row/column value. While this invention does not require connection to a database, the presently preferred embodiment of the invention uses calling conventions for data access that are consistent with database access frameworks such as ADO.NET and JDBC. By keeping the calling conventions consistent with these other frameworks, there is an immediate familiarity by the software developer, minimizing the effort required to utilize the invention.

If a database connection is utilized, in exemplary embodiments, a drop in replacement database driver is developed, creating an immediate leveraged use of the architecture defined in this invention. By creating a drop in replacement and having a few extra exposed methods, functions, and/or objects, performance is maximized. Unlike ADO.NET and JDBC, all records are bulk read into memory for direct processing. Care must be taken with memory reserves based off of this requirement. In some implementations, there are additional options to utilize windowed record loads, following the standard ADO.NET and JDBC paradigm.

FIG. 7 outlines the general internal flow when getting a specific row and column value.

If the data is requested using a row and lookup name, then flow begins at lockup name LNAME 705.

Examples of lookup names include first_name, last_name, customer_id, address, zipcode, customer.zipcode, and northeast.customer.zipcode. More details were provided on lookup name to column number in FIG. 4 CNAME 430, TNDID 435, and DBSNID 440.

Referring to both FIG. 7 and FIG. 4A, the column is resolved to an column number RESV 710 by using the cross indexing mechanism described in FIG. 4A CNAME 430, TNID 435 and DBSNID 440, then flow continues at get a value by row and column number GVAL 725. Get value by row and column number GVAL 725 can be requested directly for faster performance, or arrives at this function indirectly as a result of calling get value by row and column lookup LNAME 705. The row requested is the row number, starting at zero. The column requested is the column number, starting at zero.

While cross indexing name to column number is a rapid process, with many iterations this could become a bottleneck. Preferably, a helper function is available to the developer that returns the column number when a name is passed in, allowing the user to maximize performance if necessary.

Once the column number is found, the column attribute COLATTR 402 is indexed for the contents. At that point, it must be determined if the column is fixed or dynamic FIXORDYN 730. A test is performed on dynamic data element+flags with bit zero DFLAGS 465. If the result is fixed, flow continues at fixed FIX 732. If the result is dynamic, flow continues with dynamic DYN 733.

Fixed flow FIX 732 continues by calculating the offset to the row and column of data FIXCALC 735. This was discussed in depth on description of FIG. 5.

Once the "fixed final offset" is determined from FIG. 5, the proper number of bytes is read as documented in data type definitions DTD 470 (See FIG. 4B) and is directly coerced to the proper data type if CPU endianness is the same or only a single byte FIXGET 740. If endianness is opposite and multiple bytes long, the bytes are swapped accordingly for numbers in a temporary register first and then coerced to the proper data type with little overhead. An exception to checking endianness is TYPE_CHAR because data is preferably stored in this column as UTF-8, which is not altered based off of the endianness of the CPU. TYPE_CHAR also requires type detail DETAIL 450 to be populated with the length in bytes of the fixed character block. Another exception to checking endianness is TYPE_FIXEDBINARY because the data format is assumed to be in a universal binary format. TYPE_FIXEDBINARY also requires type detail DETAIL 450 to be populated with the length in bytes of the fixed byte block.

At this point, a check is performed FIXMTCH 745 to determine if the data requested is in the same format as requested by the caller. If the data types are the same, flow continues through FIXY 747, then the value is directly returned RTN1 755 as the result value of the function. If not, flow continues through FIXN 748, where the data is coerced into the caller's requested format FIXCOERCE 750 and then returned RTN1 755 to the caller as the result value of the function. An example coercion would be converting an integer into a string.

Dynamic flow DYN 733 continues by calculating the "dynamic final offset" from FIG. 6B to the data DYNCALC 760 and was explained in depth on the description of FIG. 6A and FIG. 6B.

The data pointer is resolved at DYNGET 762. A check is performed to find out if the data type TYPE 445 matches the caller's requested type DYNMATCH 765.

In the presently preferred embodiment, a string is defined as types TYPE_VARCHAR, TYPE_NVARCHAR, TYPE LONGNVARHAR, TYPE_LONGVARHAR, TYPE_NCHAR, TYPE_SQLXML, and TYPE_CHAR. All are preferably stored in memory in UTF-8 text format. The different types are only for reference as possible hints to how the original data was stored in a database or other storage mechanism.

Other embodiments of this invention may store the text in more formats, using names reflective of the format's type.

If the data matches the caller's requested type DYNMATCH 765, flow continues with yes Y 766 and the reference or pointer to the dynamic data element is returned to the caller RTN2 795.

In presently preferred embodiments of the invention, most data would be returned as a raw reference or pointer to an allocation but there could be exceptions such as TYPE_SUB 495. In the case of TYPE_SUB 495, the pointer returned would be the data object or data structure after deserialization, allowing rapid data access to the sub-hierarchy. More details of exceptions are covered in description of FIG. 6B.

If the data does not match the caller's request type, DYNMATCH 765, continues with no N 767 to STR 770. A check is then performed determining if the data type is a string (described above).

If the data is determined to be a string STRY 771, flow continues through FIXMTCH 745 and continues on the path described in section describing FIXMTCH 745 above.

Figure 8:
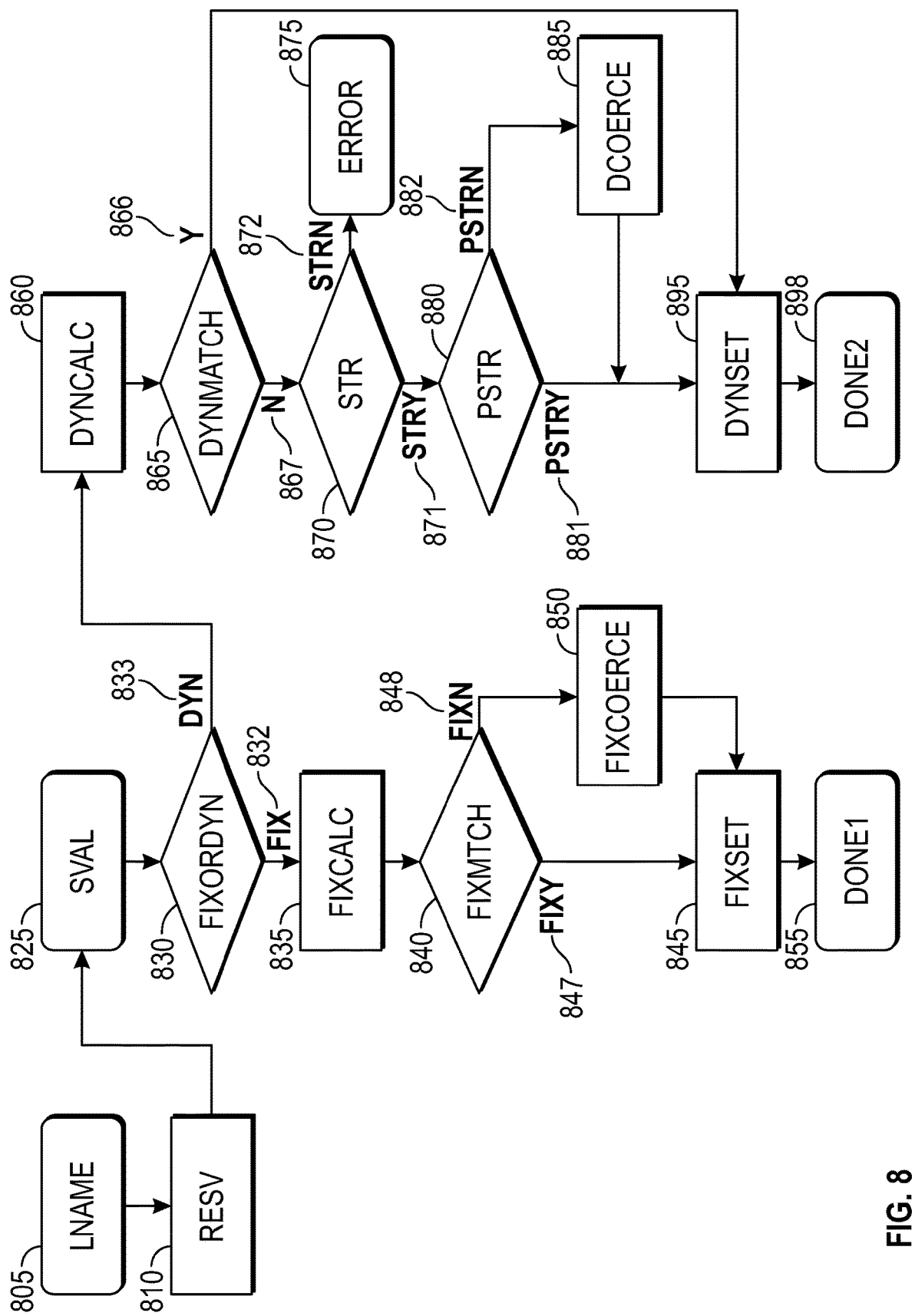
FIG. 8 is a flow chart for setting row and column values.

If the data is not a string, and does not match the data type requested, flow continues through STRN 772 and continues to ERROR 775 where an error is produced and returned to the caller. On another embodiment, additional coercions of different types could be created, passed in by the caller of the function, or initialized by the developer as coercion types available, FIG. 8 is a flow chart for setting a row/column value.

If the data is requested using a row and lookup name, flow begins at lookup name LNAME 805.

Examples of lookup names include first_name, last_name, customer_id, address, zipcode, customer.zipcode, and northeast.customer.zipcode.

The column is resolved RESV 810 to a column number using the cross indexing mechanism described in FIG. 4A CNAME 430 TNID 435 DBSNID 440, then flow continues to set a value by row and column number SVAL 825.

Set value by row and column number SVAL 825 can be requested directly for faster performance, or arrives at this function indirectly as a result of calling set value by row and column lookup LNAME 805. The row requested is the row number, starting at zero. The column requested is the column number, starting at zero.

While cross indexing name to column number is a rapid process, with many iterations could become a bottleneck. In presently preferred embodiments of the invention, a helper function is available to the developer that returns the column number when a name is passed in, allowing the user to maximize performance if necessary.

Once the column number is found, the column attributes COLATTR 402 is indexed for the contents. At that point, it must be determined if the column is fixed or dynamic FIXORDYN 830. A test is performed on dynamic+flags with bit zero DFLAGS 465. If the result is fixed, flow continues at fixed FIX 832. If the result is dynamic, flow continues with dynamic DYN 833.

Fixed flow FIX 832 continues by calculating the "fixed final offset" to the data FIXCALC 835. This was discussed in depth on description of FIG. 5.

A check is performed comparing the data type passed in to the data type of the element FIXMTCH 840.

If the value passed in matches the data type of the element, flow continues through FIXY 847 and continues to FIXSET 845.

If the value passed in does not match the data type of the element, flow continues through FIXN 848 where the data is coerced into the requested data type 850. An example coercion would be converting a string to an integer. Another example would be converting a TYPE_TINYINT (2 bytes) to a TYPE_INTEGER (4 bytes). Flow then continues to FIXSET 845.

With the data offset determined, and the proper number of bytes as documented in data type definitions DTD 470, the value is coerced and set at the final offset in memory ROWS 550 to the proper data type if endianness is the same, or if only a single byte FIXSET 845. If endianness is opposite and multiple bytes long, the bytes are swapped accordingly for numbers in a temporary register first and then the value is coerced and set at the proper data offset in memory ROWS 550 with little overhead. An exception to checking endianness is TYPE_CHAR as data is stored in this column as UTF-8 which is not altered based off of the endianness of the CPU. TYPE_CHAR also requires type detail DETAIL 450 to be populated with the length in bytes of the fixed character block. Another exception to checking endianness is TYPE_FIXEDBINARY and the data format is assumed to be in a universal binary format. TYPE_FIXEDBINARY also requires type detail DETAIL 450 to be populated with the length in bytes of the fixed byte block. Once endianness is proper, flow then continues to FIXSET 845.

FIXSET 845 stores the actual fixed data element in memory as explained in detail on FIG. 5.

Once the value has been set, the function returns to the caller DONE1 855.

Dynamic flow DYN 833 continues by calculating the "dynamic final offset" to the data DYNCALC 860 and was explained in depth on the description of FIG. 6A and FIG. 6B. With the data now resolved DYNCALC 860 a check is performed to find out if the data type TYPE 445 checking against matches the data type of the passed in value DYNMATCH 865.

A string is defined as types TYPE_VARCHAR, TYPE_NVARCHAR, TYPE LONGNVARCHAR, TYPE_LONGVARCHAR, TYPE_NCHAR, TYPE_SQLXML, and TYPE_FIXEDCHAR. On this embodiment of the invention are all stored in memory as UTF-8 text format. The different types are only for reference as possible hints to how the original data was stored in a database or other storage mechanism. Other embodiments of this invention may store the text in more formats, using names reflective of the format's type.

If the value matches the data type Y 886, flow continues to DYNSET 895 where the value passed in is cloned in memory and the dynamic data pointer in concurrent set of pointers is updated to point at the cloned value as outlined in FIG. 6A and FIG. 6B. Processing is then complete DONE2 898. In some programming languages the old pointer must be marked to be freed or is freed directly. Other languages automatically free the pointer when it is no longer used. In some programming languages, cloning may not be necessary when the string is defined as immutable.

In some embodiments of the invention, if the memory allocation size is the same and the size of the allocation is not large, the pointer would not be replaced, but rather the contents would be copied over the current memory allocation. What is considered large is relative to computer and processing capabilities. An example of what would be considered large could be anything larger than 255 bytes.

In presently preferred embodiments of the invention, if the dynamic data element is a date object, data structure, etc. rather than data in a memory allocation, modification could occur by simply getting the dynamic data element, as described in FIG. 7, and performing modifications directly to the dynamic data element. without performing any operations FIG. 8.

In presently preferred embodiments of the invention, most data passed in would be raw reference or pointer but there could be exceptions such as TYPE_SUB 495. In the case of TYPE_SUB 495, preferred embodiments could allow a serial stream or a pointer to the fully composed and processed structure after serialization, allowing rapid data access to the sub-hierarchy. In the presently preferred embodiment, a stream immediately be processed into the fully deserialized data form and fully composed so that access is rapid from that point forward. Placement of this condition is not included in the overview provided in FIG. 8.

In presently preferred embodiments of the invention, text elements are assumed to the UTF-8 strings. In some embodiments, there may be more text types such as wide Unicode. If there are more text types, additional coercions may be necessary to convert the incoming text type to the specific data type of the element.

If the value does not match data type N 867 is followed and, flow continues to STR 870 and a check is performed to see if the column attribute TYPE 445 is identified as text. If it isn't, flow continues through STRN 872 an error is produced ERROR 875 and returned to the caller. On another embodiment, additional coercions of different types could be created, passed in by the caller of the function, or initialized by the developer as coercion types available.

If the column attribute TYPE 445 is identified as text, flow continues through STRY 871 and a check is performed to see if the passed in data type is text PSTR 880. If it isn't, flow continues through PSTRN 872 and the passed in value is coerced to text string DCOERCE 885. In presently preferred embodiments of the invention, text is typically defined as UTF-8. Coercion could include coercing to the proper text format. On another embodiment, additional coercions of different types could be created, passed in by the caller of the function, or initialized by the developer as coercion types available.

If the passed in data type is text, flow continues through PSTRY 881 and proceeds to DYNSET 895.

Lastly, the pointer to the dynamic data element is updated to utilize a clone of the text string as outlined in FIG. 5 DYNSET 895. Flow then continues to DONE2 898 and processing is complete. In some programming languages the old pointer must be marked to be freed or is freed directly. Other languages automatically free the pointer when it is no longer used. In some programming languages, cloning may not be necessary when the string is defined as immutable.

In some embodiments of the invention, if the memory allocation size is the same and the size of the allocation is not large, the pointer would not be replaced, but rather the contents would be copied over the current memory allocation. What is considered large is relative to computer and processing capabilities. An example of what would be considered large could be anything larger than 255 bytes.

Figure 9:
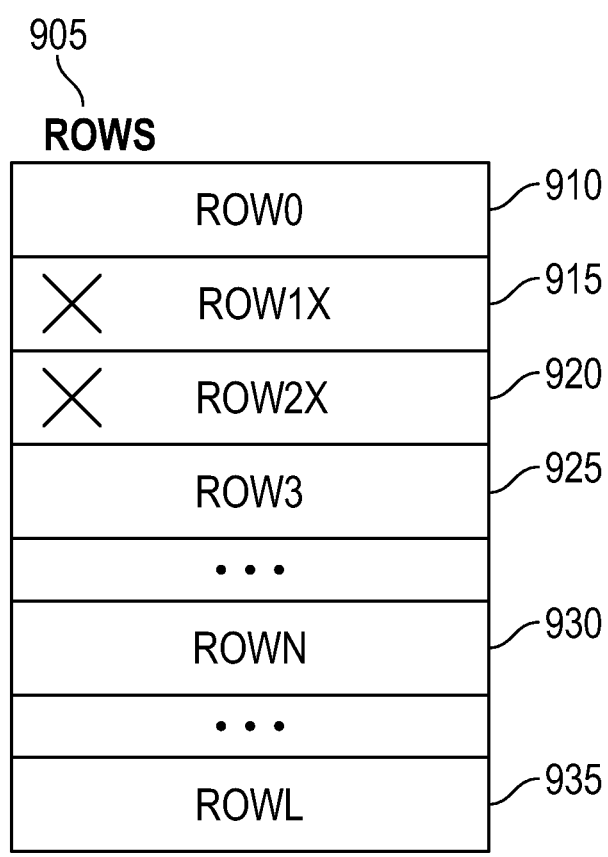
FIG. 9 is a block diagram of an example for deleting rows.

FIG. 9 is a block diagram and supplemental information for deleting rows by example. FIG. 9. details the relatively simple process that rows are deleted. ROWS 905 is an abstract block diagram of all the rows of data associated with a schema. In the standard flow, instead of actually deleting rows, rows are marked as deleted. By doing so, this minimizes the necessity for thread locking. Advanced programming techniques can avoid full locks in many situations.

The most critical area that thread locking must occur is when adding rows when the reserved row space is depleted.

In that case, the fixed data element pool and the dynamic data element memory pointer store must be re-allocated and the data copied to the newly allocated space. In some embodiments of the invention, storage, containers utilizing different mechanism for storage may not need to re-allocate and copy.

The caller of the delete function can specify for a full re-allocation to occur that would actually remove deleted rows completely from the data set. In addition, the programmer can instruct the invention to automatically remove deleted rows completely at any given time. Care must be taken performing this instruction as full thread locking is required as well as a performance-penalty.

While the actual internal programming structure for marking a row deleted is not dictated, it typically follows a bit format similar to the one used in the nullzone, but at a row level, and it is independent of the data structures described to this point.

In the presently preferred embodiment of the invention, when the data is serialized, the rows that are marked deleted are skipped. When the data is then de-serialized, the new copy does not have the deleted rows, nor the markers of any rows being deleted.

In the example provided by FIG. 9. row 0 ROW0 910, row 3 ROW3 925, arbitrary row n ROWN 930, and row last ROWL 935 are not deleted. In addition rows not listed in the diagram are not deleted. The only two rows that are deleted are row 1 ROW1X 915 and row 2 ROW2X 920.

Following FIG. 3 diagram that a programmer would use to process records, If the row deleted, DEL 350 would only fellow the path to Y2 352 on the deleted records row 1 ROW1X 915 and row 2 ROW2X 920. If more records were deleted, the path would be followed accordingly for the additional records.

Figure 10:
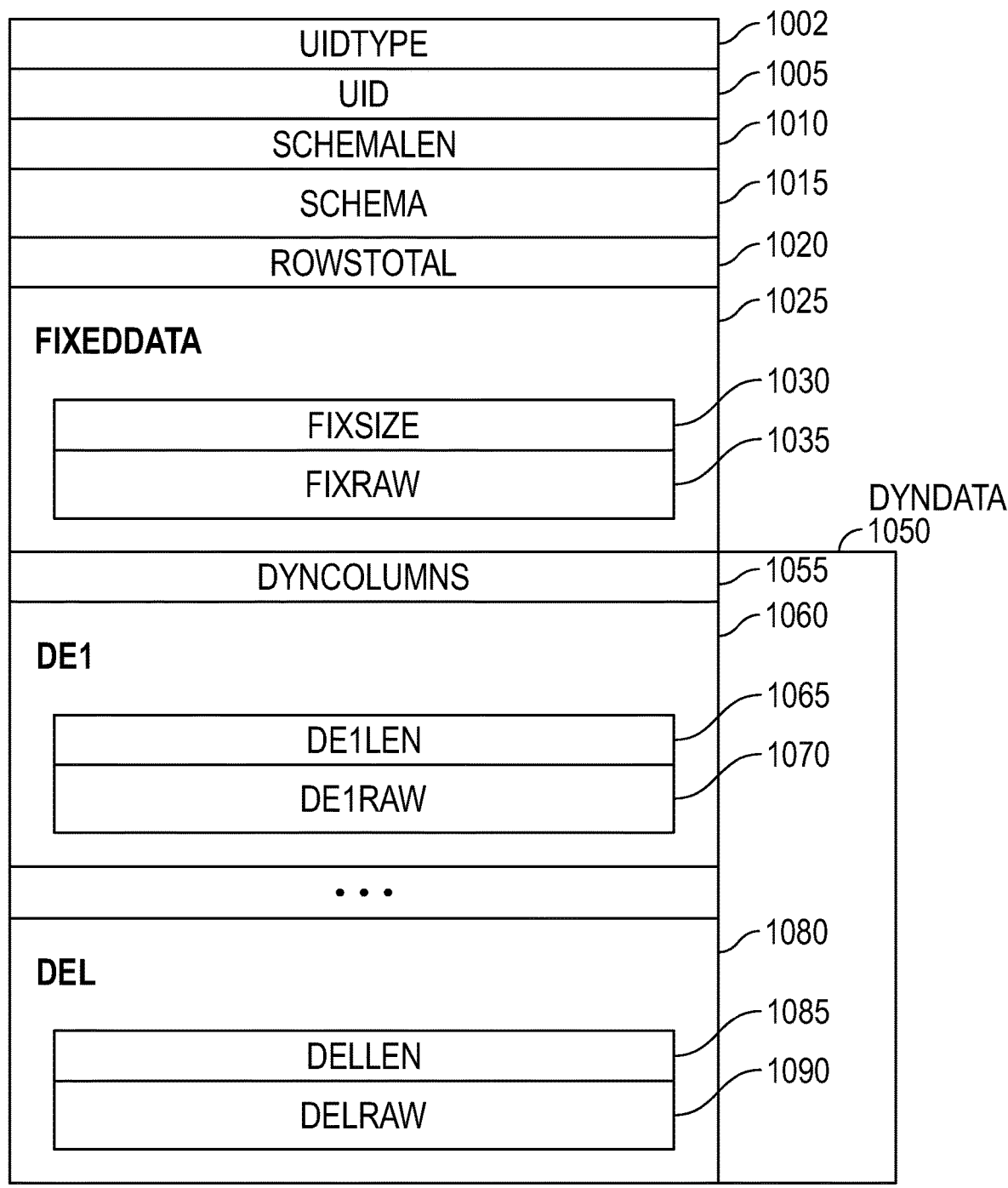
FIG. 10 Provides a block diagram providing an overview of serialization.

FIG. 10 Provides a block diagram over-viewing serialization. The same process is used for deserialization. Care has been taken on design of the invention so that the data closely mirrors how it is utilized when in-memory. Due to the lack of complexity to translate for serialization, there is very little overheat to prepare the data.

The unique identifier type identifier UIDTYPE 1002 defines the type of unique identifier used for lookup. The default populated value for this identifier is UIDTYPE_SHA1 for usage of secure hash algorithm 1 (SHA-1) as it is nearly impossible for accidental collision. UIDTYPE_CRC for usage of cyclic redundancy check (CRC) can also be used in bandwidth or processing constrained environments. In other embodiments of the invention, more unique identifier type identifier definitions may exist.

On the tail end of initializing a schema, the unique identifier 1005 code is generated and then can be utilized whenever serialization operations are performed.

In practical embodiments of the invention, the UIDTYPE may not be utilized, and instead a single default type with a specific lockup could be utilized.

In other practical embodiments of the invention, both UIDTYPE and UID lookup may not be utilized. In this case, the schema would have to be included any time serialization and deserialization are performed. If unique identifier type UIDTYPE 1002 is UIDTYPE_SHA1, a 20 byte secure hash algorithm 1 (SHA-1) UID 1005 code is computed and utilized on serialized schema data. This serves as a unique identifier as there is a 1 in 2 raised to the power of 160 chance of duplication. This same type of technique is used on other projects such as Git, Mercurial, and Monotone for unique hash lookups. On the preferred embodiment of the invention, the unique identifier type for SHA-1 is 2.

If unique identifier type UIDTYPE 1002 is UIDTYPE_CRC, a 4 byte cyclic redundancy check (CRC) UID 1005 is computed and utilized on serialized schema data. This serves as a unique identifier as there is a 1 in 4,294,967,295 chance of duplication. This same type technique is used in hash style lookups in many programming scenarios. The schema lookup CRC UID 1005 is serialized in big-endian format and is a four byte integer. On the preferred embodiment of the invention, the unique identifier type for CRC is 1.

In presently preferred embodiments of the invention, the schema length identifier SCHEMALEN 1010 defines the length, typically in bytes, of the schema information that follows. If the context of the receiver is known and the receiver has already received a schema with this value, the length is set to zero as the receiver already has the schema. Typically, when serialization is occurring to some form of data storage for archiving, the entire schema is always included.

If the schema length identifier is determined to be necessary (non-zero), then the schema is serialized SCHEMA 1015. The schema serialization is covered in detail in FIG. 11.

In some cases, the code utilizing the invention must use some form of thread locking as required to insure a proper snapshot of the data is performed. In some embodiments of the invention, functions are provided to perform some form of thread locking.

The total number of rows identifier ROWSTOTAL 1020 is then serialized. The number of rows may be different than the rows contained in the set. Code utilizing the invention can specify all rows, or specific rows requiring serialization. For example, if the row data contains all customers, and only one customer needs to be transmitted, only one row would be serialized. It is important to note that deleted rows are automatically subtracted out before this value is set.

Specified fixed data elements are serialized in block FIXEDDATA 1025.

The "fixed row size" typically in bytes including the null zone FIXSIZE 1030 follow. This element is optional, because the schema also contains this information and the presently preferred embodiment of the invention provides the identifier, insuring that if the schema is currently unavailable at the time of deserialization that most information can still be processed. Refer to "fixed row size" FL 545 for calculation.

The static row block in raw bytes in FIX RAW 1035. If there are no rows deleted, and the code utilizing the invention requests all rows, the raw bytes of all the fixed data element rows and fixed data element columns as outlined in ROWS 550, in entirety, are dumped to the stream.

If there are rows deleted or if a smaller set is requested for serialization by the code utilizing the invention, then proper memory chunks of the requested rows are dumped to the stream. Deleted rows, even if the code utilizing the invention, specifies them, are not included in serialization by default in the presently preferred embodiment.

Dynamic data element information is then serialized as shown in the box DYNDATA 1050.

An identifier for the a total columns that contain dynamic data DYNCOLUMNS 1055 is serialized. While this element is optional because the schema also contains this information, the presently preferred embodiment of the invention provides the identifier insuring that, if the schema is currently unavailable at the time of deserialization, most information can still be processed. If the number of columns of dynamic data information is zero, at this point, serialization is complete.

If there is at least one dynamic data column, the first specified dynamic data element from the concurrent set of pointers is serialized in block DE1 1060.

In the presently preferred embodiment of the invention, if the element is not null, the "length"+1 (preferred in bytes) byte length identifier is serialized for the dynamic data element DE1LEN 1065. In the presently preferred embodiment of the invention, the byte length identifier is the length in bytes of the allocation or the length in bytes of the serialized form of the data object, data structure, etc. If the element is null, 0 is serialized. In practical embodiments of the invention, some other form of identifier could be utilized thereby accomplishing the same goal. It is preferred that if serialization and deserialization are necessary, that the overhead for serialization should be minimal.

If the dynamic data element is not null, DE1RAW 1070 is serialized by taking the dynamic data element (which is data in a dynamic data allocation or a serialized data object, serialized data structure, etc.) and dumping it to the stream, preferably without conversion.

An example of a serialized dynamic data element is the data type TYPE_SUB 495 (see FIG. 4B). This type of data still preceded with the length identifier followed by the serialized data. When this type is encountered, the reference to the schema+row+column(s) must be serialized following the same serialization pattern outlined here in FIG. 10, but for the child dynamic data element. Utilizing this type, it is possible to have sub-rows of information defined with different schema effectively creating hierarchies of data, in the typical implementation of the invention. Upon deserialization, the TYPE_SUB 495 branches are also in deserialized data form, allowing immediate hierarchical access to all sub-rows and columns.

In some embodiments of the invention, more exceptions with serialization dynamic data elements could be plugged in allowing serialized utilization of the specific data type. Examples of additional exceptions are compression/decompression and encryption/decryption.

This process continues by looping similar to DE1LEN 1065, and DE1RAW 1070 for each element contained in the concurrent set of pointers for all dynamic element columns and all dynamic element rows until the last specified dynamic data element is serialized in the same manner (as shown in block DEL 1080), including the last dynamic element "length"+1 DELLEN 1035 and then the raw bytes DELRAW 1090. It is important to realize that there may be no dynamic data elements, or only 1 dynamic data element unlike the dynamic data element blocks outlined in FIG. 10.

Figure 11:
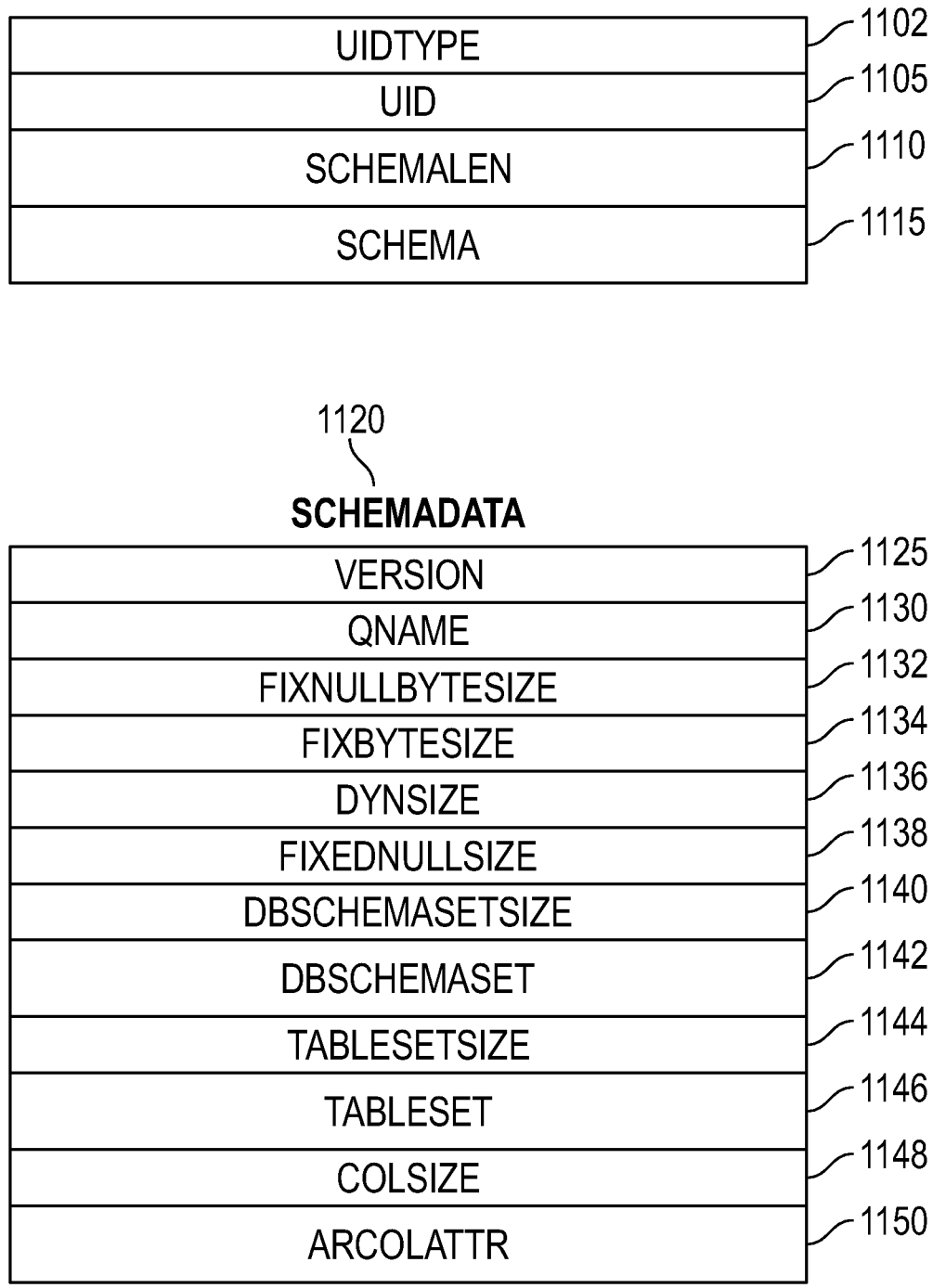
FIG. 11 is a block diagram providing detail for serialization of the schema. The same process is used in reverse for deserialization.
Figure 12:
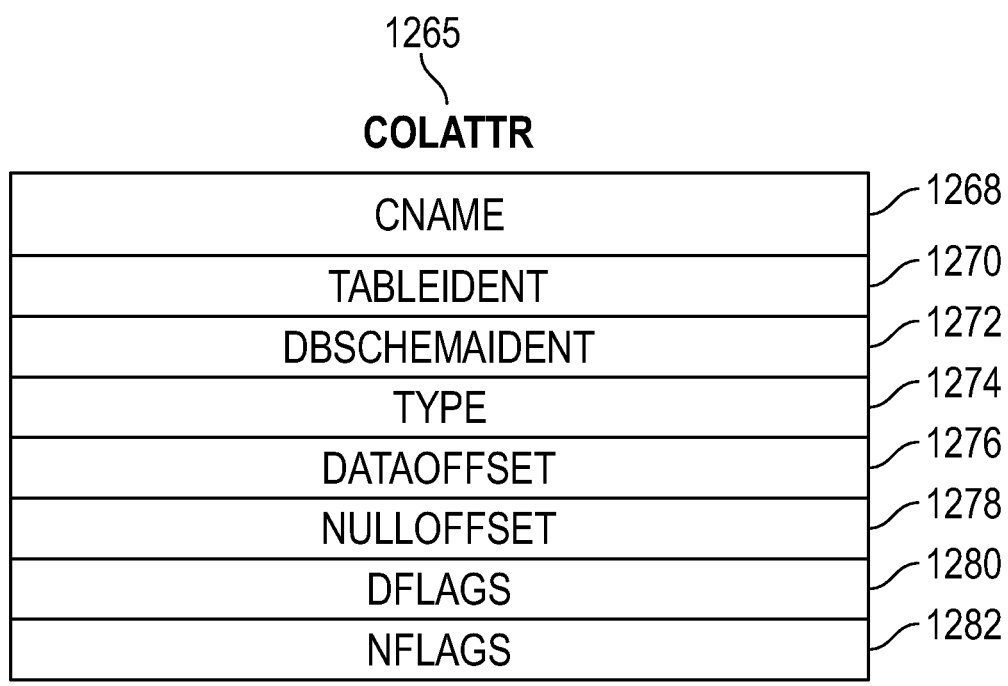
FIG. 12 is a block diagram providing detail for the serialization of each column attribute in the schema, as outlined in the set of column attributes ARCOLATTR 1150.

FIG. 11 is a block diagram providing detail for serialization of the schema. The same process is used for deserialization. For following the flow of serialization of the schema, FIG. 12 is also necessary as it provides details for serialization of each column attribute.

While the unique identifier type, unique identifier, schema length identifier, and schema set were covered in UID 1005 SCHEMALEN 1010 and SCHEMA 1015, they are provided here as well for clarity. For more details on the schema data elements that are serialized, refer to FIG. 4A.

In practical embodiments of the invention, the UIDTYPE 1102 may not be utilized, and instead a single default type with a specific lookup could be utilized.

In other practical embodiments of the invention, both UIDTYPE 1102 and UID 1105 lookup may not be utilized.

In this case, the schema would have to be included any time serialization and deserialization are performed.

The unique identifier type UIDTYPE 1102 defines the type of unique identifier used for identification. The default identifier is UIDTYPE_SHA1 for secure hash algorithm 1 (SHA-1) as it is nearly impossible for accidental collision. UIDTYPE_CRC for cyclic redundancy check (CRC) can also be used in bandwidth or processing constrained environments. In other embodiments of the invention, more unique identifier type definitions may exist.

In preferred embodiments of the invention, on the tail end of initializing a schema, a unique identifier UID 1105 code is generated and can then be used when serialization requests are performed.

If unique identifier type UIDTYPE 1102 is UIDTYPE_SHA1, a 20 byte SHA-1 UID 1105 code is computed and utilized on serialized schema data. This serves as a unique identifier as there is a 1 in 2 raised to the power of 160 chance of duplication. This same type of technique is used on other projects such as Git, Mercurial, and Monotone for unique hash lookups.

If unique identifier type UIDTYPE 1102 is UIDTYPE_CRC, a 4 byte CRC UID 1105 is computed and utilized on serialized schema data. This serves as a unique identifier as there is a 1 in 4,294,967,295 chance of duplication. This same type technique is used in hash style lookups in many programming scenarios. The unique identifier UID 1105 is serialized in big-endian format and is a four byte integer.

The byte length of unique identifier UID 1105 is dependent on the unique identifier type UIDTYPE 1102.

Refer to FIG. 10 for more details on UIDTYPE 1002 and UID 1005.

In a presently preferred embodiment of the invention, the schema length identifier SCHEMALEN 1110 defines the length in bytes of the schema information that follows. If the context of the receiver is known and the receiver has already received a schema with this value, the length is set to zero. Typically, when serialization is occurring to some form of data storage for archiving, the entire schema is always included. In practical embodiments of the invention, other identifier formats could be utilized accomplishing the same goal.

If the schema length identifier is determined to be necessary (non-zero), then the schema is serialized SCHEMA 1115.

The block schema data SCHEMADATA 1120 provides the details for serialization of SCHEMA 1115.

The optional first element is a version identifier VERSION 1125. The version is currently 1 and can be changed by other embodiments of the invention. This allows embodiments of the invention flexibility to change the structure of all data serialized. It is important to realize that compatibility should be maintained with the version 1 presented in all serialization information of this document. Preferred embodiments always utilize the version identifier. Practical embodiments may omit the identifier.

Quick lookup name is preferred to be a UTF-8 encoded string QNAME 1130. For serialization purposes, all UTF-8 encoded strings in the schema are preceded with the byte length of the string as a identifier. The quick lookup name can be optionally used as a way to quickly construct a new data set. Practical embodiments of the invention may omit this identifier.

Column fixed null size identifier FIXEDNULLBYTESIZE 1132 serializes the number of bytes used for nullable fixed data elements in a row. This item is not required but is preferred. This item can be computed by iterating through the schema columns that are defined as fixed and nullable, calculating the number of bits, and rounding appropriately to the number of bytes required as previously discussed in FIG. 4A.

"fixed row size" identifier FIXBYTESIZE 1134 serializes the number of bytes of fixed data elements. Refer to FIG. 5, "fixed row size" FL 545 for calculation. This item is not required but is preferred. This item can be computed by iterating through the schema columns that are defined as fixed and totaling up the byte sizes of each element and, lastly, adding the amount of bytes necessary for the row's null zone. This value is the number of bytes required for a single row.

"dynamic row size" identifier DYNSIZE 1136 serializes the total number of columns that are identified as dynamic. This item is not required but is preferred. This item can be computed as the sum of results of iterating through the column types TYPE 445 (see FIG. 4A) that are categorized as dynamic data type in DTD 470 (see FIG. 4B). "dynamic row size" was discussed in depth on FIG. 6.

Column fixed total nulls identifier FIXEDNULLSIZE 1138 serializes the total number or columns that are fixed and are nullable. This item is not required but is preferred. This item can be computed by iterating through the column attributes that are defined as fixed and nullable as the sum of the results for a single row.

Element schema set name size identifier DBSCHEMASETSIZE 1140 serializes the length identifier of database schema names that follow.

Set of element database scheme names (string—UTF-8) DBSCHEMASET 1142. To serialize the set in the currently preferred embodiment of the invention, each database schema name string is looped through, written with a identifier byte length for the string, followed by the UTF-8 string.

Element table name length identifier TABLENAMESIZE 1144 serializes the number of element table names that follow.

Set of table names (string—UTF-8) TABLESET 1146. To serialize the set in the currently preferred embodiment of the invention, each string in the set is looped through, written with a identifier byte length for the string, followed by the DTF-8 string.

Column size identifier COLSIZE 1148 serializes the number of column attributes that follow.

Set of column attributes ARCOLATTR 1150. To serialize the set, each column attribute outlined in FIG. 12 is looped through and serialized defining each column of information.

In practical embodiments of the invention, database schema names, and table names may be omitted, and in that case, any references and identifiers to those fields during the serialization process would not be included.

FIG. 12 is a block diagram providing detail for the serialization of each column attribute in the schema as outlined in set of column attributes ARCOLATTR 1150. The same process is used for deserialization. For following the flow of serialization of the schema, FIG. 11 must be used in conjunction with FIG. 12.

The column attributes COLATTR 1265 for the column starts with serializing the column's name CNAME 1268. In the presently preferred embodiment, the columns name is a UTF-8 string. As mentioned previously, UTF-8 strings are preceded with a byte length identifier followed by the UTF-8 string.

Lookup of the table name TABLEIDENT 1270 is serialized and in the presently preferred embodiment is a big-endian 4 byte integer.

Lookup of the database schema name DBSCHEMAIDENT 1272 is serialized and in the presently preferred embodiment is a big-endian 4 byte integer.

Data type identifier TYPE 1274 is serialized. Some of the values are defined in FIG. 4B data type definitions DTD 470.

Data column offset identifier DATAOFFSET 1276 is serialized and is described in depth on FIG. 4A DATAOFFSET 455. This optional serialized component is utilized in the presently preferred embodiment.

Data null offset identifier NULLOFFSET 1278 is serialized and is described in depth on FIG. 4A. NULLOFFSET 460. This optional serialized component us utilized in the presently preferred embodiment.

Dynamic data element flags identifier 1280 is serialized and is described in depth on FIG. 4A DFLAGS 465.

Nullable+Flags identifier NFLAGS 1282 is serialized and is described in depth on FIG. 4. NFLAGS 467.

In practical embodiments of the invention, database schema names, and table names may be omitted, and in that case, any references and identifiers to those fields during the serialization process would not be included.

In practical embodiments of the invention, the column name could be omitted and the only way to access a column would be by column identifier rather than name.

Figure 13A:
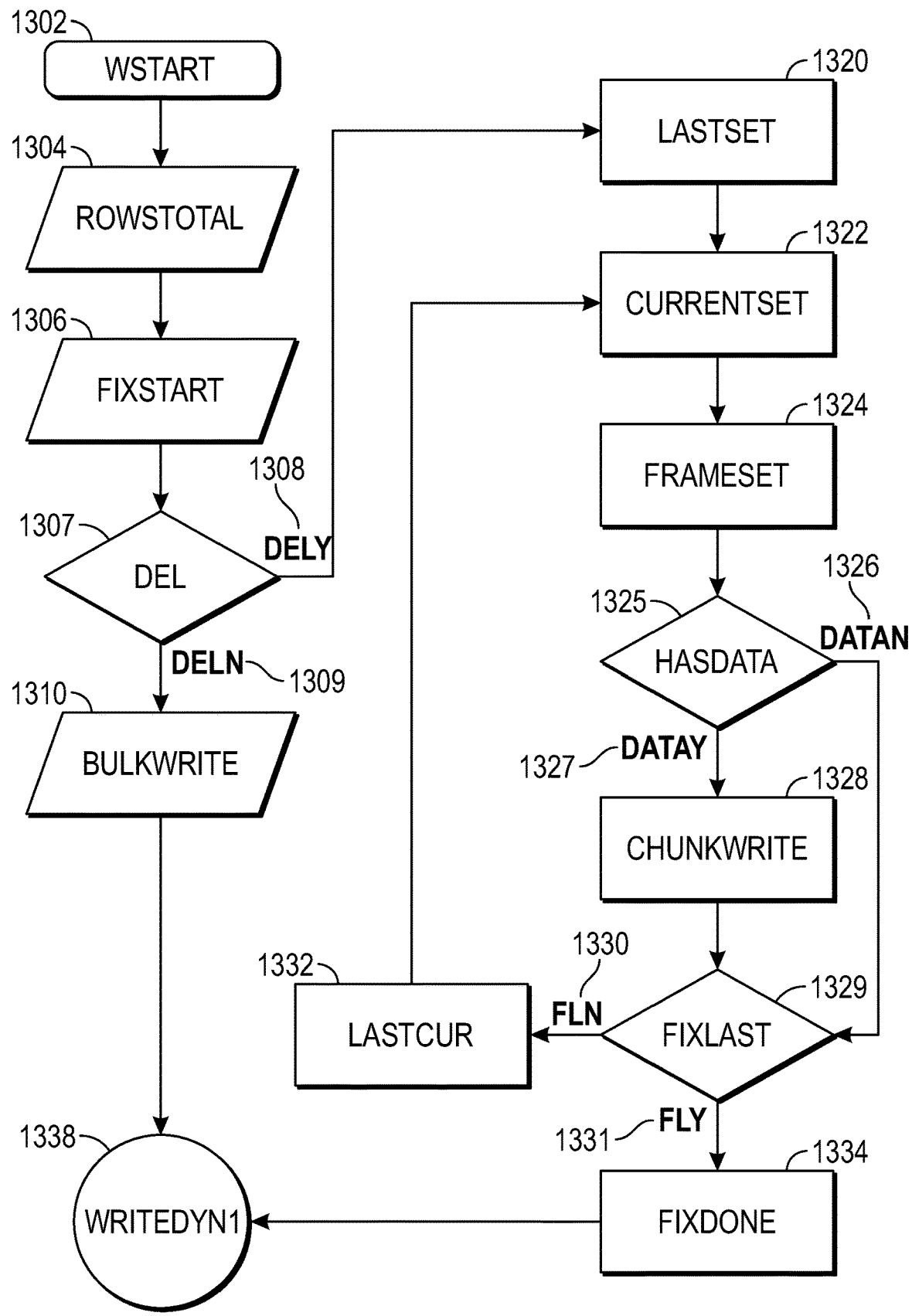
FIG. 13A is a flow chart outlining the serialization of fixed data.

FIG. 13A is a flow chart outlining the serialization of fixed data. FIG. 13 does not cover serialization of the schema as the explanation of FIG. 11 and FIG. 12 is sufficient. This information should also be paired with description of FIG. 10 for a complete understanding of the serialization process.

Figure 13B:
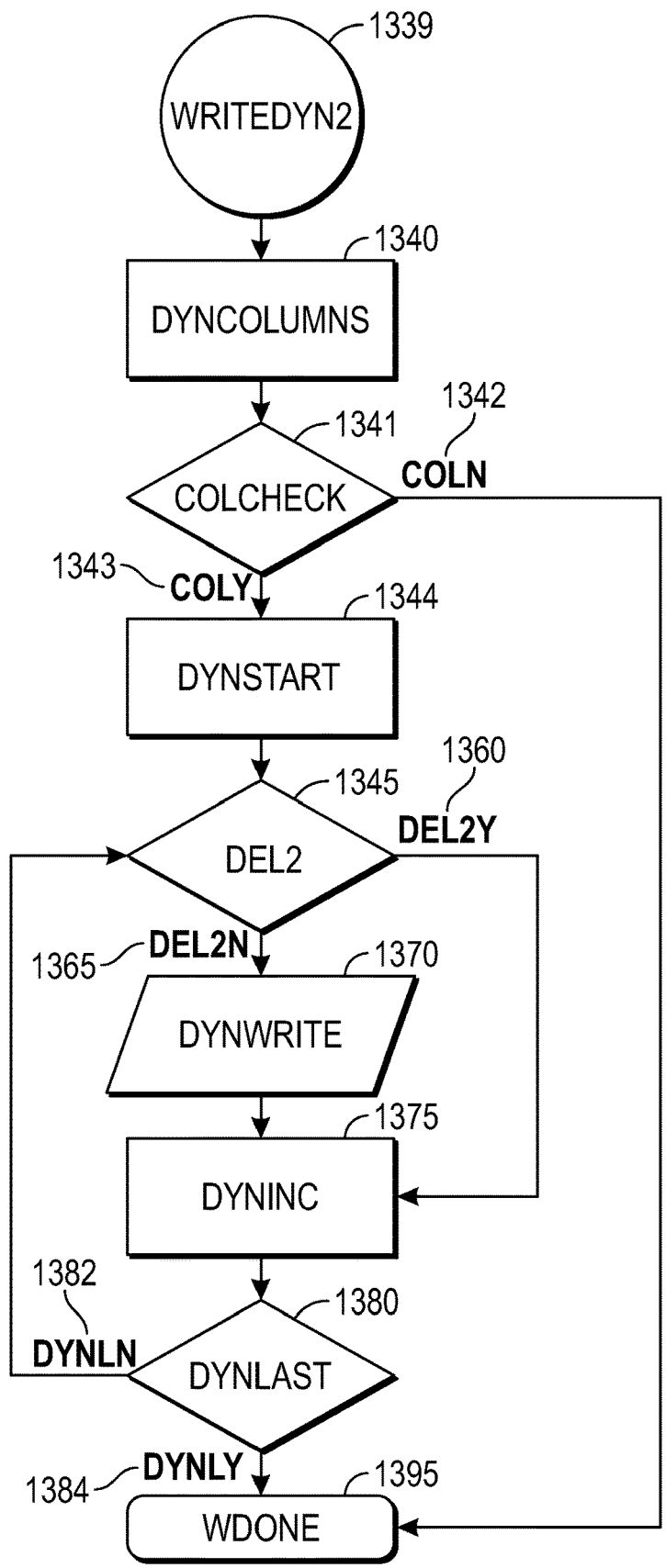
FIG. 13B is a flow chart outlining the serialization of dynamic data.

Once fixed data serialization is complete, flow continues with serialization of dynamic data in FIG. 13B.

The goal of the flow chart is to improve clarity of the process necessary to serialize information. Methods for serialization could be optimized for better performance as that is not the goal of the FIG. 13A and FIG. 13B.

The flow chart covers the scenario of serialization of all data elements with no rows deleted. In addition, the scenario also covers if one or more rows have been deleted. The flow chart does not cover the case of the user requesting specific rows for serialization, but the pattern would be similar to implement.

Once serialization of the schema has occurred as outlined in FIG. 11 and FIG. 12, the start WSTART 1302 occurs.

Excluding deleted the identifier for total number rows to be transmitted, that are valid to be written serialized ROWSTOTAL 1304.

Then, the "fixed row size" is serialized FIXSTART 1306. This element is optional, but in the presently preferred embodiment of the invention, is included.

A check DEL 1807 is performed to find out if any rows are deleted. If there are no rows deleted, flow continues through DELN 1309. The process is very easy as the fixed data allocation is dumped to the serial stream, excluding the reserved space BULKWRITE 1310. Refer to FIG. 5 access to fixed data elements for more, information. Flow then continues to WRITEDYN1 1338 to write dynamic data elements.

Refer to WRITEDYN2 1339 below to continue the process of serialization.

If there are rows deleted, LASTSET 1320 the variable, "delete row last" is set to −1.

"delete row current"=next row in the deleted set CURRENTSET 1322. If there are no further deleted rows, then "delete row current" is set to "last row"+1. The rows deleted are always in ascending order.

FRAMESET 1324 sets "start"="delete row last"+1 and "end"="delete row current"-1. These two variables are setting the range of valid fixed row data to be serialized.

A check is performed if ("end"-"start") is greater than or equal to zero HASDATA 1325. if the value is not greater than zero, flow continues through DATAN 1326 as the set is empty, and process continues at 1329 described below.

If the value is greater than or equal to zero, flow continues through DATAY 1327.

On presently preferred embodiments of the invention utilizing a single allocation for fixed-data elements, by using the math equation outlined in description of FIG. 5: "row offset"=("row number") times ("fixed row size"). An allocation chunk copy to the serialization (stream) CHUNKWRITE 1328 procedure can occur from ("start") times "row offset" to ("end"+1) times "row offset" requiring little work compared to other alternatives by the CPU.

A check is then performed on if the "delete row current" is greater than equal to last row of data FIXLAST 1329.

If "delete row current" is not greater than last row of data, flow continues through FLN 1330 and then "delete row last" is set to "delete row current" LASTCUR 1332 and processing is looped back up to CURRENTSET 1322.

If "delete" row current is greater than or equal to last row of data flow continues through FLY 1131, then fixed serialization is complete FIXDONE 1334. Processing continues then to WRITEDYN1 1338 Write dynamic data elements. Flow continues on FIG. 13B WRITEDYN2 1339.

This is a simplified version of the serialization structure. Performing serialization on specific rows that the caller requests is also necessary in the presently preferred embodiment of the invention. The process is not included in this diagram but is similar in flow.

FIG. 13B is a flow chart outlining the serialization of dynamic data. FIG. 13B is a continuation of the serialization flow chart detailing fixed data in FIG. 13A. FIG. 13B does not cover serialization of the schema as the explanation of FIG. 11 and FIG. 12 is sufficient. This information should also be paired with description of FIG. 10 for a complete understanding of the serialization process.

Process continues via connector from FIG. 13A WRITEDYN1 1338 to FIG. 13B WRITEDYN2 1339 to write dynamic data elements.

An identifier for the total columns that contain dynamic data WRITEDYN2 1339 is serialized. While this element is optional because the schema also contains this information, the presently preferred embodiment of the invention provides the identifier insuring that, if the schema is currently unavailable at the time of deserialization, most information can still be processed.

A check is performed to find out if there are any dynamic data elements COLCHECK 1341. If there are no dynamic data elements, flow continues through COLN 1342 and serialization is complete WDONE 1395.

If there are dynamic data elements, flow continues through COLY 1343,

The variable "row" is set to zero DYNSTART 1344.

A check is then performed testing if the row is deleted DEL2 1345. If the row is deleted, flow continues through DEL2Y 1360 and processing continues at DYNINC 1375 described below.

If the row is not deleted, flow continues through DEL2N 1365 and proceeds to DYNWRITE 1370.

At DYNWRITE 1370, a loop is performed for all columns on the row that contain dynamic data elements. In the presently preferred embodiment, for a specific column: if dynamic data element is not null, the "length" plus 1 in bytes byte length identifier is serialized for the dynamic data element. If the element is null, 0 identifier is serialized. Refer to DE1LEN 1065. Lastly, if not null and not zero bytes in length, the dynamic data element serialized for the dynamic data element as described in DE1RAW 1070. In practical embodiments of the invention, some other method accomplishing the same goal could be utilized for serialization.

The variable "row" is incremented DYNINC 1375 by performing "row"="row" plus 1.

A check is then performed testing if "row" is greater than last row of data DYNLAST 1380.

if "row" is not greater last, flow continues through DYNLN 1382 and proceeds back to DEL2 1345.

If "row" is greater than last, flow continues through DYNLY 1384 and proceeds to WDONE 1395 and the serialization process is complete.

This is a simplified version of the serialization structure. Performing serialization on specific rows that the caller requests is also necessary in the presently preferred embodiment of the invention. The process is not included in this diagram but is similar in flow.

Figure 14A:
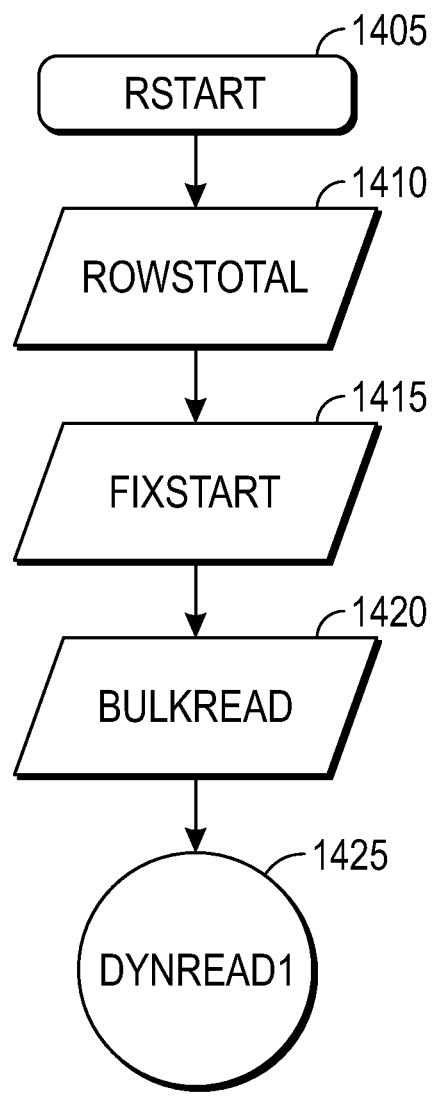
FIG. 14A is a flow chart detailing the deserialization process of fixed data.

FIG. 14A is a flow chart detailing the deserialization process of fixed data. FIG. 14A does not cover serialization of the schema as the explanation of FIG. 11 and FIG. 12 is sufficient. This information should also be paired with description of FIG. 10 for a complete understanding of the serialization process.

The goal of the flow chart 18 to improve clarity of the process necessary to deserialize information. Methods for deserialization could be optimized for better performance as that is not the goal of the FIG. 14A and FIG. 14B.

After deserialization and reconstituting the schema has occurred, entry point to start RSTART 1405 occurs.

The total number of rows identifier is read ROWSTOTAL 1410.

At this point reading fixed row data occurs FIXSTART 1415, starting with reading "fixed row size" identifier from the stream. While this element is optional, the presently preferred embodiment of the invention utilizes this identifier.

Fixed data is bulk read BULKREAD 1420 from the stream. Refer to FIG. 5 Access to fixed data elements and FIG. 10 FIXEDDATA 1025, FIXSIZE 1030, and FIXRAW 1035 for more details on the fixed data block. In the presently preferred embodiment of the invention, BULKREAD 1420 does not require looping as it is typically just a stream to memory operation, reconstituting the fixed data.

Figure 14B:
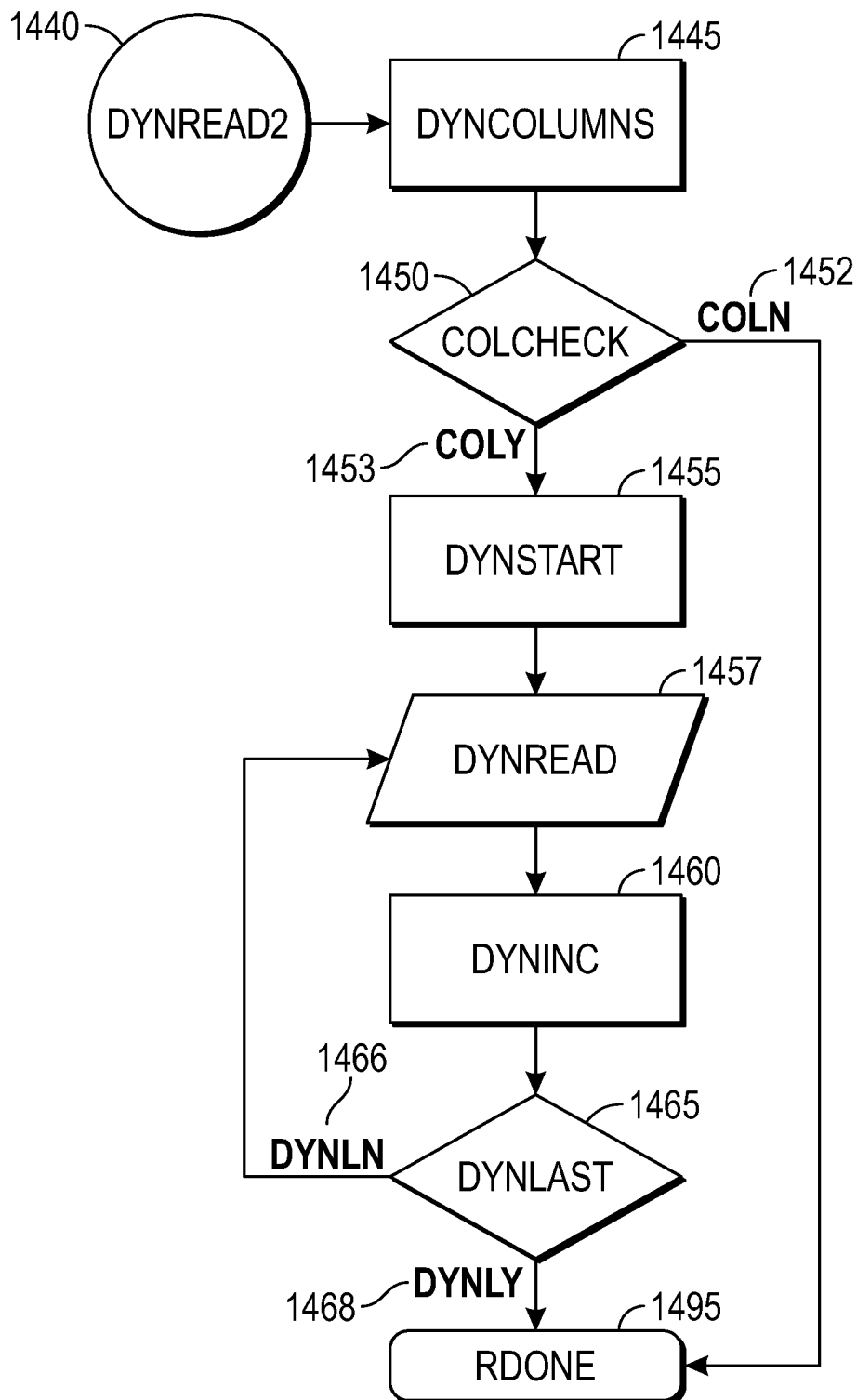
FIG. 14B is a flow chart detailing the deserialization process of dynamic data.

After the fixed-data has been bulk read, flow continues to read dynamic data elements DYNREAD1 1425 that connects to FIG. 14B DYNREAD2 1440.

FIG. 14B is a flow chart detailing the deserialization process of dynamic data. FIG. 14B is a continuation of the deserialization flow chart detailing fixed data in FIG. 14A. does not cover serialization of the schema as the explanation of FIG. 11 and FIG. 12 is sufficient. This information should also be paired with description of FIG. 10 for a complete understanding of the serialization process.

Bead dynamic data elements DYNREAD2 1440 continues to reading "dynamic row size" identifier DYNCOLUMNS 1445. While this is optional and the schema also contains this information, the presently preferred embodiment of the invention includes this insuring if the schema is currently unavailable at the time of deserialization, that most information can still be processed.

A check is then performed testing if there are any dynamic columns COLCHECK 1450. If there is not, flow continues through COLN 1452 to RDONE 1495 and deserialization is complete.

If there are dynamic columns, flow continues through COL 1453 to DYNSTART 1455 where the variable "row" is set to zero.

A loop is performed for all columns on the row that contain dynamic data elements DYNREAD 1457. For a specific column: A identifier is read. If the byte length identifier read is zero, the dynamic data element is initialized to null. If the identifier is non-zero, the length is determined by subtracting one from the identifier read. This can be expressed as "length"=identifier value−1. Refer to DEI1LEN 1065. Lastly, if not null and the length is not zero, the dynamic data element is deserialized by reading the number of bytes specified for the dynamic data element as described in DE1RAW 1070.

Next the variable "row" is incremented 1460 by performing something equivalent to "row"="row"+1.

A test is performed checking if "row" is greater than the last row of data DYNLAST 1445. If "row" is not greater than the last row of data, flow continues through DYNLN 1466 and loops back to DYNREAD 1457.

If "row" is greater than the last row of flow continues through DYNLY 1468. At this point, the entire dynamic area, fixed area, and the schema are reconstituted. Deserialization is complete RDONE 1495.

The present invention has been disclosed above in relation to various presently preferred and practical embodiments for purposes of illustration and description only. These embodiments are not intended to be exhaustive or to limit the scope of this invention to the disclosed embodiments. A person of ordinary skill in the art would recognize that various modifications can be made to the disclosed embodiments that still fall within the spirit and scope of this invention. For example, equivalent elements may be substituted for those illustrated and described herein, and certain features of the invention may be utilized independently of the use of other features, all as would be apparent to one in the art after having the benefit of this description of the invention. Accordingly, the scope of this invention is to be defined by the appended claims (including by application of the doctrine of equivalents), not the preceding disclosure, and no limitations are to be inferred or implied into the scope of the invention, except for those limitations specifically and explicitly stated in the attached claims.

INDUSTRIAL APPLICABILITY

The present invention is applicable whenever it is desired to increase the efficiency of accessing, storing and transmitting data elements.

What is claimed is:

1. A process for serialization of data elements stored in a computer memory, wherein said data elements include data elements defined by a schema into a set of rows, with data elements in each row related to each other, and with each of said rows containing columns, all said data elements related to a column by said schema having the same column attributes, said column attributes defining whether data elements in a column are fixed data elements or dynamic data elements, and byte length of each of said fixed data elements, wherein said fixed data elements are stored in fixed element rows and fixed element columns in at least one fixed length allocation in said memory, said fixed data elements in said fixed element rows being related to each other, said fixed data elements in said fixed element columns having the same column attributes, and said fixed data elements in a fixed element column of a fixed element row corresponding to said fixed data elements in the same fixed element column in different fixed element rows, wherein dynamic data elements are stored in dynamic element rows and dynamic element columns in dynamic data allocations in said memory, said dynamic data elements in said dynamic element rows remaining related to each other, said dynamic data elements in said dynamic element columns having the same column attributes, and said dynamic data elements in a dynamic element column of a dynamic element row corresponding to said dynamic data elements in the same dynamic element column in different dynamic element rows, comprising:

generating a schema length identifier, identifying byte length of said schema;

sending to a serial stream said schema, whereby ending of said schema can be determined by said schema length identifier;

providing a total number of rows indicator to said serial stream indicating a total number of said rows;

sending to said serial stream said fixed data elements directly, without conversion, from said fixed-length allocations;

generating byte length identifiers stating byte length of each dynamic data element for each column having dynamic data elements; and sending to said serial stream said dynamic data elements, each dynamic data element with a byte length identifier for that dynamic data element, whereby ending of each said dynamic data element is determined from said byte length stated in said byte length identifier.

2. A process according to claim 1, further comprising:

receiving from said serial stream said schema;

reconstituting said schema, whereby ending of said schema can be determined by said schema length identifier;

receiving from said serial stream said total number of rows identifier;

receiving and storing said fixed data elements, without conversion, in receiving fixed element rows and receiving fixed element columns in receiving fixed data allocations in a receiving memory, whereby said fixed data elements are reconstituted in said receiving fixed element rows and said receiving fixed element columns;

receiving said stream for said dynamic data elements, whereby ending of each dynamic data element is determined from said byte length identifier; and storing said dynamic data elements in receiving dynamic element rows and receiving dynamic element columns in receiving dynamic data allocations in said receiving memory, whereby said dynamic data elements are reconstituted in said receiving dynamic element rows and said receiving dynamic element columns in said receiving memory.

3. A process according to any one of claims 1 to 2, wherein said fixed data elements are selected from the group consisting of native data and binary data.

4. A process according to any one of claims 1 to 2, wherein said dynamic data elements are selected from the group consisting of native data, binary data, and deserialized data.

5. A process according to any one of claims 1 to 2, further comprising:
creating a set of pointers in said memory which point to said dynamic data allocations which contain said dynamic data elements, said dynamic data elements being defined by said pointers into dynamic element rows and dynamic element columns.

6. A process according to claim 2, wherein said storing said dynamic data element step is performed without conversion.

7. A process according to claim 1, wherein said sending to said serial stream said dynamic data elements step is performed without conversion.

8. A process according to any one of claims 1 to 2,
wherein at least one of said column attributes is whether a data element is nullable, whereby at least one of said fixed data elements could be null, further comprising:
generating a null zone identifying fixed data elements that have a column attribute of being nullable, identifying when a column containing fixed data elements has a row containing a null value.

9. A process for efficiently accessing and storing data elements in a computer memory, wherein said data elements are defined by a schema into a set of rows with said data elements in each row related to each other, and with each of said rows containing columns, all said data elements related to a column by said schema having the same column attributes, said column attributes defining whether said data elements in a column are fixed data elements or dynamic data elements, and byte length of each of said fixed data elements, and said data elements in a column of a row corresponding to said data elements in the same column in different rows, comprising:
determining from said column attributes of said schema whether said data elements in a column are fixed data elements or dynamic data elements;
without conversion, storing said fixed data elements in fixed element rows and fixed element columns in at least one fixed length allocation in said memory, with fixed data elements in said fixed element rows remaining related to each other, said fixed data elements in said fixed element columns having the same column attributes, and said fixed data elements in a fixed element column of a fixed element row corresponding to said fixed data elements in the same fixed element column in different fixed element rows; and
storing said dynamic data elements in dynamic element rows and dynamic element columns in dynamic data allocations in said memory, said dynamic data elements in said dynamic element rows remaining related to each other, said dynamic data elements in said dynamic element columns having the same column attributes, and said dynamic data elements in a dynamic element column of a dynamic element row corresponding to said dynamic data elements in the same dynamic element column in different dynamic element rows;
wherein at least one of said column attributes is whether a data element is nullable, whereby at least one of said fixed data elements could be null, further comprising:
generating a null zone identifying fixed data elements that have a column attribute of being nullable, identifying when a column containing fixed data elements has a row containing a null value.

10. A process according to claim 9, wherein said null zone is stored in said at least one fixed data allocation.

11. A process according to claim 9, wherein said null zone is stored in a null zone allocation in said memory.

12. A process for getting data elements stored in a computer memory, said data elements defined by a schema into a set of rows, with data elements in each row related to each other, and with each of said rows containing columns, all said data elements related to a column by said schema having the same column attributes, said column attributes defining whether data elements in a column are fixed data elements or dynamic data elements, and byte length of each of said fixed data elements, wherein said fixed data elements are stored in fixed element rows and fixed element columns in at least one fixed length allocation in said memory, said fixed data elements in said fixed element rows being related to each other, said fixed data elements in said fixed element columns having the same column attributes, and said fixed data elements in a fixed element column of a fixed element row corresponding to said fixed data elements in the same fixed element column in different fixed element rows, wherein dynamic data elements are stored in dynamic element rows and dynamic element columns in dynamic data allocations in said memory, said dynamic data elements in said dynamic element rows remaining related to each other, said dynamic data elements in said dynamic element columns having the same column attributes, and said dynamic data elements in a dynamic element column of a dynamic element row corresponding to said dynamic data elements in the same dynamic element column in different dynamic element rows, comprising:
getting a requested data element having a requested column and a requested row, by determining from said column attribute of said schema for said requested column whether said requested data element is a fixed data element or a dynamic data element;
if said requested data element is a fixed data element, translating said requested column and said requested row to a fixed element row and a fixed element column and accessing said fixed element row and said fixed element column in said fixed length allocation;
getting, without conversion, said requested fixed length data element;
if said requested data element is a dynamic data element, translating said requested column and said requested row to a dynamic element row and a dynamic element column and accessing said dynamic element row and said dynamic element column in said dynamic length allocation; and
getting said requested dynamic data element;
wherein at least one of said column attributes is whether a data element is nullable, whereby at least one of said fixed data elements could be null, further comprising:
generating a null zone identifying fixed data elements that have a column attribute of being nullable, identifying when a column containing fixed data elements has a row containing a null value.

13. A process for setting data elements in a computer memory, said data elements defined by a schema into a set of rows, with data elements in each row related to each other, and with each of said rows containing columns, all said data elements related to a column by said schema having the same column attributes, said column attributes defining whether data elements in a column are fixed data elements or dynamic data elements, and byte length of each of said fixed data elements, wherein said fixed data elements are stored in fixed element rows and fixed element columns in at least one fixed length allocation in said memory, said fixed data elements in said fixed element rows being related to each other, said fixed data elements in said fixed element columns having the same column attributes, and said fixed data elements in a fixed element column of a fixed element row corresponding to said fixed data elements in the same fixed element column in different fixed element rows, wherein dynamic data elements are stored in dynamic element rows and dynamic element columns in dynamic data allocations in said memory, said dynamic data elements in said dynamic element rows remaining related to each other, said dynamic data elements in said dynamic element columns having the same column attributes, and said dynamic data elements in a dynamic element column of a dynamic element row corresponding to said dynamic data elements in the same dynamic element column in different dynamic element rows, comprising:

setting a value of a requested data element having a requested column and a requested row, by determining from said column attribute of said schema for said requested column whether said requested data element is a fixed data element or a dynamic data element;

if said requested data element is a fixed data element, translating said requested column and said requested row to a fixed element row and a fixed element column and accessing said fixed element row and said fixed element column in said fixed length allocation;

setting said value, without conversion, at said fixed element row and said fixed element column; and if said requested data element is a dynamic data element, storing said requested data element in a new dynamic memory allocation in said memory;

translating said requested column and said requested row to a dynamic element row and a dynamic element column and accessing said dynamic element row and said dynamic element column; and replacing said dynamic data element for said dynamic element row and said dynamic element column with said requested data element in said new dynamic memory allocation in said memory;

wherein at least one of said column attributes is whether a data element is nullable, whereby at least one of said fixed data elements could be null, further comprising:

generating a null zone identifying fixed data elements that have a column attribute of being nullable, identifying when a column containing fixed data elements has a row containing a null value.

14. A process for efficiently accessing and storing fixed data elements in a computer memory, wherein said fixed data elements are defined by a schema into a set of rows with said fixed data elements in each row related to each other, and with each of said rows containing columns, all said fixed data elements related to a column by said schema having the same column attributes, said column attributes defining byte length of each of said fixed data elements, and said fixed data elements in a column of a row corresponding to said fixed data elements in the same column in different rows, comprising:

storing said fixed data elements in fixed element rows and fixed element columns in at least one fixed length allocation in said memory, with fixed data elements in said fixed element rows remaining related to each other, said fixed data elements in said fixed element columns having the same column attributes from said schema, and said fixed data elements in a fixed element column of a fixed element row corresponding to said fixed data elements in the same fixed element column in different fixed element rows;

wherein at least one of said column attributes is whether a data element is nullable, whereby at least one of said fixed data elements could be null, further comprising:

generating a null zone identifying fixed data elements that have a column attribute of being nullable, identifying when a column containing fixed data elements has a row containing a null value.

15. A process according to any one of claims 12 to 14, wherein said null zone is stored in a null zone allocation in said memory.

16. A process according to any one of claims 12 to 14, wherein said fixed data elements are selected from the group consisting of native data and binary data.

\* \* \* \* \*